United States Patent

Mitsui

(10) Patent No.: US 12,001,731 B2
(45) Date of Patent: Jun. 4, 2024

(54) PRINTING DEVICE

(71) Applicant: SEIKO EPSON CORPORATION, Tokyo (JP)

(72) Inventor: Yoichi Mitsui, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/494,479

(22) Filed: Oct. 25, 2023

(65) Prior Publication Data

US 2024/0143244 A1    May 2, 2024

(30) Foreign Application Priority Data

Oct. 27, 2022   (JP) .................. 2022-172121

(51) Int. Cl.
*G06F 3/12*       (2006.01)
(52) U.S. Cl.
CPC .......... *G06F 3/1205* (2013.01); *G06F 3/1267* (2013.01); *G06F 3/1204* (2013.01)
(58) Field of Classification Search
None
See application file for complete search history.

(56) References Cited

U.S. PATENT DOCUMENTS

| | | | |
|---|---|---|---|
| 2018/0220889 A1* | 8/2018 | Dirghangi | A61B 3/156 |
| 2020/0341700 A1 | 10/2020 | Yasukaga | |
| 2022/0121884 A1* | 4/2022 | Zadeh | G06V 10/764 |

FOREIGN PATENT DOCUMENTS

JP        2008-077323 A       4/2008

* cited by examiner

*Primary Examiner* — Darryl V Dottin
(74) *Attorney, Agent, or Firm* — WORKMAN NYDEGGER

(57) ABSTRACT

A printing device includes a control section that is configured to receive designation of a first print mode or a second print mode for one or more print jobs and cause the printing section to execute printing in accordance with print setting, wherein a consumption amount of a medium in the printing of one print job in the second print mode is larger than a consumption amount of the medium in the printing of one print job in the first print mode and the control section acquires, from among the print setting information, specific setting information that causes a difference in the consumption amount of the medium between printing in the first print mode and printing in the second print mode from different acquisition sources for the print job for which the first print mode is designated and the print job for which the second print mode is designated.

8 Claims, 17 Drawing Sheets

| No. | FIRST PRINT MODE (TEST PRINT) | SECOND PRINT MODE (ACTUAL PRINT) |
|---|---|---|
| 1 | INITIAL SETTING INFORMATION | INCIDENTAL SETTING INFORMATION |
| 2 | INITIAL SETTING INFORMATION | SECOND SETTING INFORMATION FILE |
| 3 | INCIDENTAL SETTING INFORMATION | SECOND SETTING INFORMATION FILE |
| 4 | FIRST SETTING INFORMATION FILE | INCIDENTAL SETTING INFORMATION |
| 5 | FIRST SETTING INFORMATION FILE | SECOND SETTING INFORMATION FILE |

PROJECT NO. : 12345

DUE DATE : 2022/06/01

IMAGE FILE : LABEL1.PDF

NUMBER OF PRINT COPIES : 30 COPIES

FRONT MARGIN: ○○mm   REAR MARGIN: ○○mm

PRIMARY POST-PROCESS : XXX   BLADE TYPE : aaa

SECONDARY POST-PROCESS : YYY   NUMBER OF SLITS : 2

FIG. 7

| | |
|---|---|
| Job AA | PROJECT NO. 12345, DUE DATE ---, NUMBER OF PRINT COPIES = 30, FRONT MARGIN ○○ mm, REAR MARGIN ○○ mm, PRIMARY POST-PROCESS ---, SECONDARY POST-PROCESS --- |
| Job BB (G1) | PROJECT NO. 10111, DUE DATE ---, NUMBER OF PRINT COPIES = 40, FRONT MARGIN ○○ mm, REAR MARGIN ○○ mm, PRIMARY POST-PROCESS ---, SECONDARY POST-PROCESS --- |
| Job FF (G1) | PROJECT NO. 10222, DUE DATE ---, NUMBER OF PRINT COPIES = 50, FRONT MARGIN ○○ mm, REAR MARGIN ○○ mm, PRIMARY POST-PROCESS ---, SECONDARY POST-PROCESS --- |
| Job CC (G1) | PROJECT NO. 21111, DUE DATE ---, NUMBER OF PRINT COPIES = 30, FRONT MARGIN ○○ mm, REAR MARGIN ○○ mm, PRIMARY POST-PROCESS ---, SECONDARY POST-PROCESS --- |

| | PRIMARY POST-PROCESSING MACHINE | BLADE DIE | SECONDARY POST-PROCESSING MACHINE | NUMBER OF SLITS |
|---|---|---|---|---|
| Job BB | XXX | bbb | YYY | 2 |
| Job FF | XXX | aaa | YYY | 4 |
| Job CC | XXX | aaa | YYY | 4 |

| | PRIMARY POST-PROCESSING MACHINE | BLADE DIE | SECONDARY POST-PROCESSING MACHINE | NUMBER OF SLITS |
|---|---|---|---|---|
| Job FF | XXX | aaa | YYY | 2 |
| Job CC | XXX | aaa | YYY | 4 |
| Job BB | ZZZ | bbb | YYY | 4 |
| Job AA | ZZZ | ccc | YYY | 4 |

| | PRIMARY POST-PROCESSING MACHINE | BLADE DIE | SECONDARY POST-PROCESSING MACHINE | NUMBER OF SLITS |
|---|---|---|---|---|
| Job AA | XXX | bbb | YYY | 2 |
| Job BB | XXX | bbb | YYY | 2 |
| Job FF | XXX | aaa | YYY | 4 |
| Job CC | XXX | aaa | YYY | 4 |

FIG. 13C

PRINTING DEVICE

The present application is based on, and claims priority from JP Application Serial Number 2022-172121, filed Oct. 27, 2022, the disclosure of which is hereby incorporated by reference herein in its entirety.

BACKGROUND

1. Technical Field

The present disclosure relates to a printing device.

2. Related Art

In the related art, a mechanism is known in which, when a user inputs a print job to be printed into a folder called a hot folder, the print job is automatically printed by a printer with a print setting associated with the print job.

Further, as a related technique, there is disclosed a print attribute setting method in which, among print attributes associated with the hot folder, a print attribute to which an attribute change identifier is given in advance by a user's instruction can be changed by causing the user to input a parameter when document data is input to the hot folder (see JP-A-2008-77323).

The user may print the print job input to the folder in a certain print mode, or may print the same print job in another print mode that consumes more medium than the print mode. In this case, the user needs to change the print setting applied to printing executed in a certain print mode in order to perform printing in another print mode, or conversely, in order to perform printing in the certain print mode, needs to restore the print setting that was temporarily changed in order to perform printing in the other print mode.

Also in JP-A-2008-77323, in order to perform printing in a plurality of print modes, it is necessary for the user to change or correct the printing setting to be appropriate for each print mode. Such operations are cumbersome for the user and may cause mistakes. Therefore, there is a demand for a technique for improving the ease and accuracy of print settings.

SUMMARY

A printing device includes a printing section for printing a print job on a medium; a control section that is configured to receive designation of a first print mode or a second print mode for one or more print jobs and that is configured to perform print setting, in accordance with print setting information, for print jobs for which the first print mode or the second print mode is designated and cause the printing section to execute printing in accordance with the print setting; and a storage section, wherein a consumption amount of the medium in printing of one of the print jobs in the second print mode is larger than a consumption amount of the medium in printing of one of the print jobs in the first print mode.

The control section is configured to acquire, of the print setting information for the print job for which the first print mode is designated, specific setting information that causes a difference in the consumption amount between printing in the first print mode and printing in the second print mode, from one of initial setting information of printing stored in advance in the storage section, incidental setting information accompanying the print job for which the first print mode is designated, or a first setting information file that is saved in a predetermined folder and that is a file different from both the initial setting information and the incidental setting information, and is configured to perform print setting of the print job for which the first print mode is designated according to the acquired specific setting information.

When the control section acquires the specific setting information for the print job for which the first print mode is designated from the initial setting information, the control section acquires the specific setting information among the print setting information for the print job for which the second print mode is designated from either incidental setting information attached to the print job for which the second print mode is designated or a second setting information file which is stored in a predetermined folder and is a file different from all of the initial setting information, the incidental setting information, and the first setting information file, and when the control section acquires the specific setting information for the print job for which the first print mode is designated from the incidental setting information, the control section acquires the specific setting information for the print job for which the second print mode is designated from the second setting information file, when the control section acquires the specific setting information for the print job for which the first print mode is designated from the first setting information file, the control section acquires the print setting information for the print job for which the second print mode is designated from either incidental setting information accompanying the print job for which the second print mode is designated or the second setting information file, and the control section performs print setting of the print job for which the second print mode is designated in accordance with the acquired specific setting information for the print job for which the second print mode is designated.

BRIEF DESCRIPTION OF THE DRAWINGS

FIG. 6 is a diagram showing combinations of acquisition sources of specific setting information in a table format.

FIG. 7 is a diagram showing an example of incidental setting information of a print job.

FIG. 8 is a diagram showing an example of second setting information file.

FIG. 13A is a diagram showing post-process setting information for each print job of one collective print job group in a table format.

FIG. 13B is a diagram showing the post-process setting information for each print job of another collective print job group in a table format.

FIG. 13C is a diagram showing the post-process setting information for each print job according to a third print embodiment in a table format.

DESCRIPTION OF EMBODIMENTS

Hereinafter, embodiments of the present disclosure will be described with reference to the drawings. Note that the drawings are merely examples for describing the present embodiment. Since each drawing is an example, ratios, shapes, or shading may not be accurate, may not match each other, or may be partially omitted.

1. Outline of Device Configuration

Figure 1:
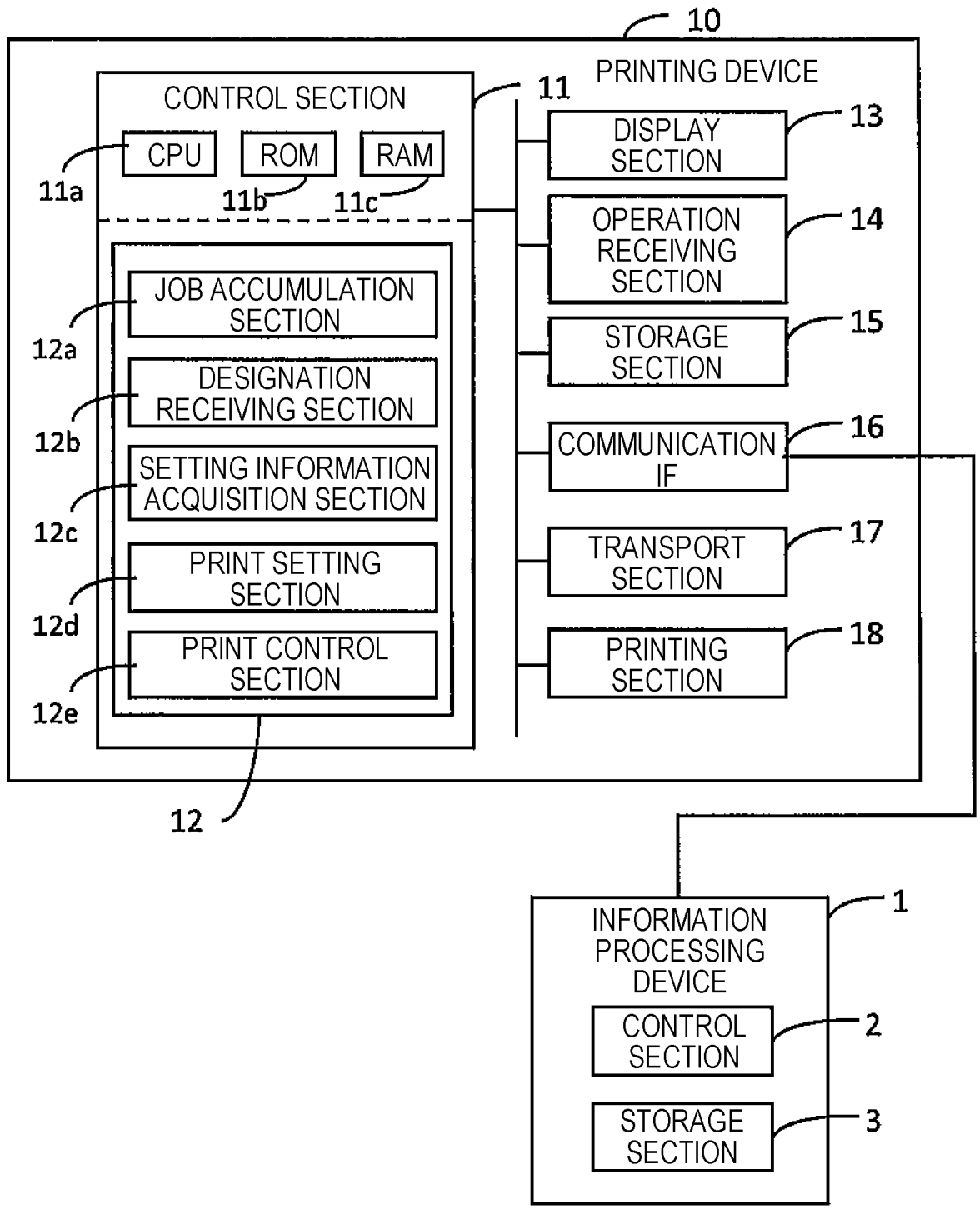
FIG. 1 is a block diagram schematically showing a device configuration of a present embodiment.

FIG. 1 schematically shows the configuration of a printing device 10 according to the present embodiment.

The printing device 10 includes a control section 11, a display section 13, an operation receiving section 14, a storage section 15, a communication IF 16, a transport section 17, a printing section 18, and the like. IF is an abbreviation for interface. The control section 11 is configured to include one or a plurality of ICs having a CPU 11a as a processor, a ROM 11b, a RAM 11c, and the like, and other nonvolatile memory, and the like.

In the control section 11, the processor, that is, the CPU 11a executes arithmetic processing according to a program 12 stored in the ROM 11b, another memory, or the like by using the RAM 11c or the like as a work area, thereby realizing various functions such as a job accumulation section 12a, a designation receiving section 12b, a setting information acquisition section 12c, a print setting section 12d, and a print control section 12e. The program 12 corresponds to a print control program. The processor is not limited to a single CPU, and may be configured to perform processing by a plurality of CPUs or a hardware circuit such as an ASIC, or may be configured to perform processing in cooperation with a CPU and a hardware circuit.

The display section 13 is a section for displaying visual information, and is configured by, for example, a liquid crystal display, an organic EL display, or the like. The display section 13 may have a configuration including a display and a drive circuit for driving the display. The operation receiving section 14 is a section for receiving an operation or an input by a user, and is realized by, for example, a physical button, a touch panel, a mouse, a keyboard, or the like. The display section 13 and the operation receiving section 14 may be collectively referred to as an operation panel of the printing device 10. When the operation receiving section 14 is a touch panel, then the operation receiving section 14 is realized as one function of the display section 13. The display section 13 may include the operation receiving section 14.

The storage section 15 is, for example, a hard disk drive, a solid state drive, or other memory storage section. A portion of the memory included in the control section 11 may be regarded as the storage section 15. The storage section 15 may be regarded as a portion of the control section 11.

The communication IF 16 is a general term for one or a plurality of IFs for the printing device 10 to perform communication with an external device by wire or wirelessly in accordance with a predetermined communication protocol including a known communication standard. The communication IF 16 is also referred to as a communication section. The external device is, for example, an information processing device such as a personal computer (PC), a server, a smartphone, a tablet terminal, or the like. In the example of FIG. 1, the printing device 10 is connected to an information processing device 1 via the communication IF 16. The number of external devices communicably connected to the printing device 10 is not limited to one. The information processing device 1 includes a control section 2 including a processor capable of executing programs and applications, and a storage section 3. Needless to say, the information processing device 1 appropriately has various functions and configurations generally possessed by the PC or the like.

The transport section 17 is a section for transporting a medium 30 along a predetermined transport path under the control of the control section 11. The transport section 17 includes, for example, a roller that rotates to transport the medium 30, a motor as a power source of rotation, and the like. In addition, the transport section 17 may be a mechanism which transports the medium 30 by mounting the medium 30 on a drum, a belt, or a pallet which is moved by the motor. The medium 30 is, for example, a sheet of paper, but may be any medium that can be a target of printing, and may be a material other than paper, such as a film, a fabric, or the like. In addition, the medium 30 may be a label paper having a release paper and a label detachably attached to the release paper.

The printing section 18 is a section for executing printing on the medium 30 using a color material such as ink or toner under the control of the control section 11. A printing method adopted by the printing section 18 is not particularly limited, and for example, there are various methods such as an ink jet method and an electrophotographic method. If the printing section 18 is configured to adopt an ink jet system, then the printing section 18 has a print head having a plurality of nozzles capable of ejecting ink dots.

The printing device 10 is one printer in which the configurations thereof are integrated.

Alternatively, the printing device 10 may be a printing system realized by connecting a plurality of devices or equipment so as to be able to communicate with each other. In the example of FIG. 1, a configuration including the printing device 10 and the information processing device 1 can be regarded as the printing system. The information processing device 1 can be understood as a print control device for controlling the printing device 10. The display section 13, the operation receiving section 14, and the storage section 15 may be a part of the printer as the printing device 10 or may be a peripheral device connected to the printer.

Figure 2:
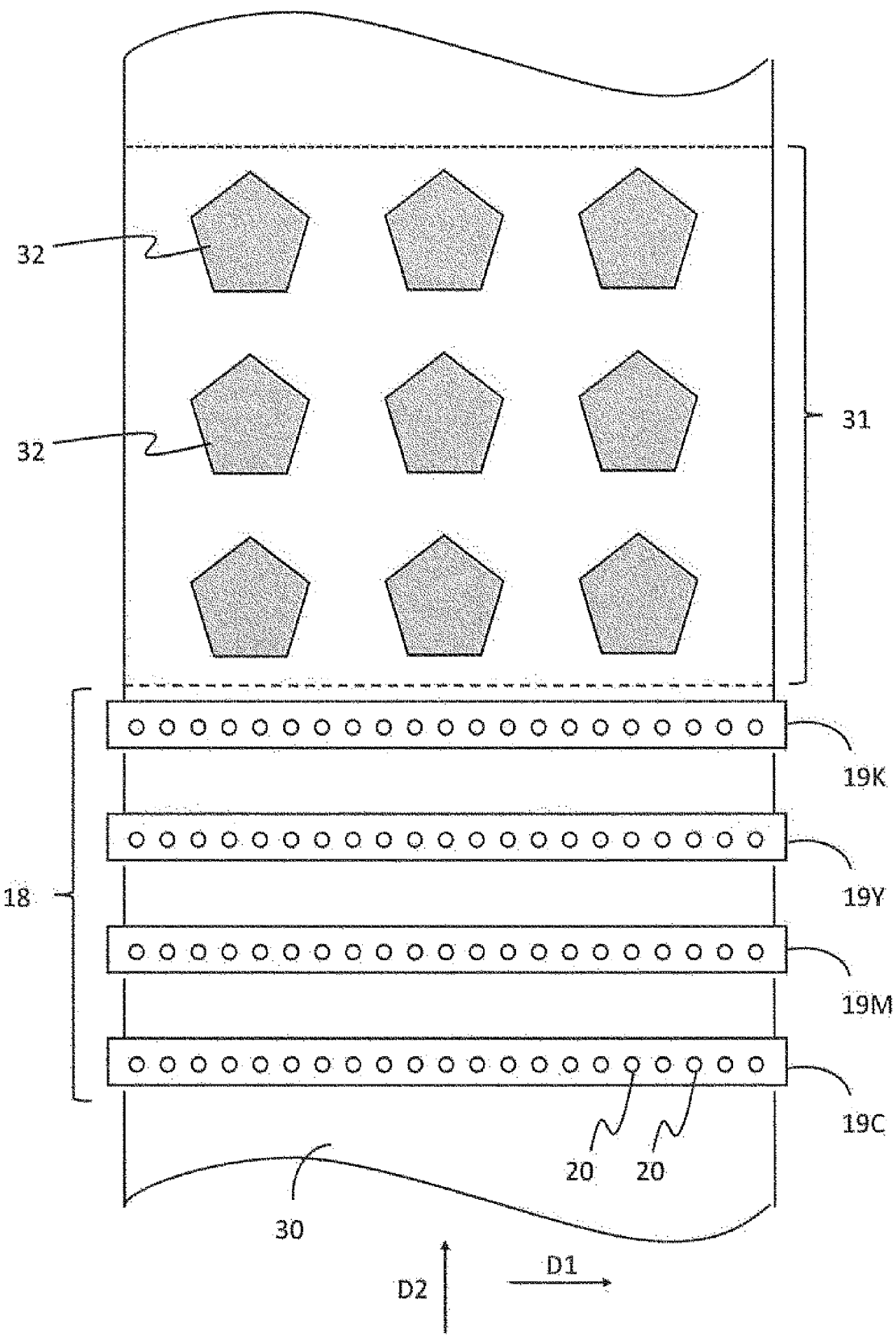
FIG. 2 is a diagram simply showing a relationship between a medium and a printing section from a viewpoint from above.

FIG. 2 shows the relationship between the printing section 18 according to an example and the medium 30 in a simplified manner as viewed from above. In the example of FIG. 2, the printing section 18 includes print heads 19C, 19M, 19Y, and 19K. The print heads 19C, 19M, 19Y, and 19K have a plurality of nozzles 20 capable of ejecting ink. Each white circle shown in FIG. 2 is an individual nozzle 20. The printing section 18 ejects a plurality of types of ink. As the ink, for example, each color ink such as cyan (C), magenta (M), yellow (Y), and black (K) are assumed. The printing section 18 may be capable of ejecting various liquids such as white ink, ink of other colors, reaction liquid, and coating liquid.

FIG. 2 very simply shows a configuration in which the plurality of nozzles 20 are arranged along a first direction D1 at a constant or substantially constant interval in each of the print heads 19C, 19M, 19Y, and 19K. A second direction D2, which intersects the first direction D1, is a transport direction D2 of the medium 30 by the transport section 17, and the transport section 17 transports the medium 30 from upstream to downstream in the transport direction D2. Hereinafter, including the description of post-process, "upstream" means upstream of transport at the time of printing, and "downstream" means downstream of transport at the time of printing. The first direction D1 and the transport direction D2 are orthogonal or substantially orthogonal to each other. The first direction D1 may be referred to as a width direction D1 of the medium 30. In the process from upstream to downstream, the transport path of the medium 30 may include a curve.

The print head 19C is a print head in which the plurality of nozzles 20 for ejecting the C ink are arranged. Similarly, the print head 19M is a print head in which the plurality of nozzles 20 for ejecting M ink are arranged, the print head 19Y is a print head in which the plurality of nozzles 20 for ejecting Y ink are arranged, and the print head 19K is a print head in which the plurality of nozzles 20 for ejecting K ink are arranged. The plurality of print heads 19C, 19M, 19Y, and 19K are arranged along the transport direction D2, and are at the same position in the width direction D1. Each of the print heads 19C, 19M, 19Y, and 19K has a length in the width direction D1 capable of covering the medium width which is a length of the medium 30 in the width direction D1.

In FIG. 2, the nozzle arrangement direction in which the plurality of nozzles 20 constituting the same print head are arranged is parallel to the width direction D1, but the nozzle arrangement direction may obliquely intersect the width direction D1. In addition, in FIG. 2, the print heads 19C, 19M, 19Y, and 19K are separated and independent from each other in the transport direction D2, but the print heads 19C, 19M, 19Y, and 19K may be a head unit in which the print heads are integrally formed.

The control section 11 causes the printing section 18 to eject ink onto the medium 30 based on print data representing an image of a print job. As is known, in the print heads 19C, 19M, 19Y, and 19K, a driving element is provided for each of the nozzles 20, and the application of a driving signal to the driving element of each nozzle 20 is controlled according to the print data, so that each nozzle 20 ejects dots or does not eject dots, and the image represented by the print data is printed on the medium 30. The control section 11 controls the transport section 17 and the printing section 18 to eject ink onto the medium 30 passing under the print heads 19C, 19M, 19Y, and 19K, thereby printing the image on the medium 30.

In the example of FIG. 2, the medium 30 is an elongated medium continuous in the transport direction D2. A region of a constant size indicated by reference symbol 31 in the medium 30 is a unit region of printing by the printing section 18, and is referred to as a frame 31. That is, the medium 30 is configured by connecting the plurality of frames 31. The dashed line shown in FIG. 2 separating frames 31 may or may not actually exist. Although not shown, a "roll body" in which the elongated medium 30 is wound in a roll shape is disposed at a predetermined position on the upstream side of the printing section 18, and the medium 30 is fed out to downstream from the rotating roll body and passes under the print heads 19C, 19M, 19Y, and 19K. The medium 30 printed by the printing section 18 is transported downstream as it is, and is wound again into the roll shape by a winding device (not shown) to be collected as a roll body. The roll body may be referred to as roll paper.

In the example of FIG. 2, a plurality of objects 32 are printed in the frame 31 downstream of the printing section 18. Here, the medium 30 is label paper, and the plurality of objects 32 are printed in one frame 31. That is, in the example of FIG. 2, the print data is data for printing such a group of the plurality of objects 32 in the frame 31.

A specific example of the printing section 18 employing the inkjet method is not limited to the configuration shown in FIG. 2. For example, the printing section 18 may include a movable carriage on which the print heads 19C, 19M, 19Y, and 19K are mounted. A configuration may be adopted in which the carriage moves parallel to the first direction D1 and/or the second direction D2 under the control of the control section 11, and during this movement, the print heads 19C, 19M, 19Y, and 19K perform printing by ejecting ink onto the medium 30 for which transport has been temporarily stopped. The nozzles of the print heads 19C, 19M, 19Y, and 19K mounted on the carriage may be arranged in the second direction D2 instead of the first direction D1.

2. Print Control Process

Figure 3:
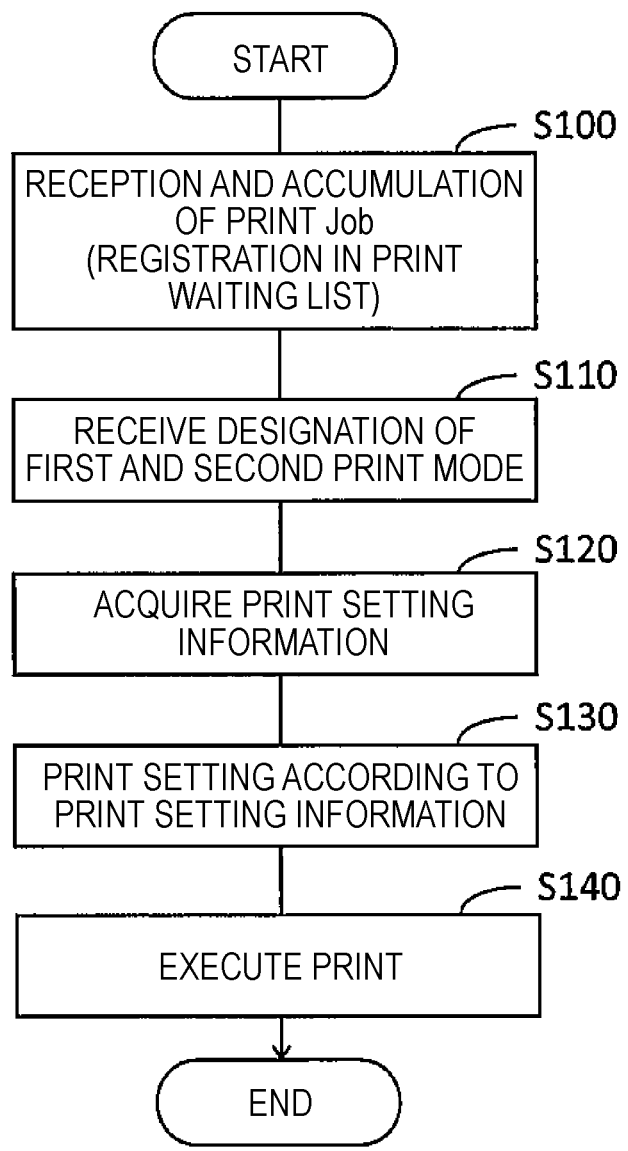
FIG. 3 is a flowchart showing a print control process.

FIG. 3 is a flowchart showing print control process executed by the control section 11 in accordance with the program 12 in response to input or instruction. The printing method is disclosed by the description of the print control process.

The user operates an external device, such as the information processing device 1, to transmit the print job to the printing device 10. For example, the user accesses the printing device 10 via the UI screen of the external device and performs an operation of moving a desired print job to a predetermined folder included in the printing device 10. Accordingly, the user can transmit the print job to the printing device 10. UI is an abbreviation for user interface.

The job accumulation section 12a of the control section 11 accumulates, in the storage section 15, print jobs transmitted from the external device and received by the communication IF 16 (step S100). Step S100 corresponds to an accumulation step of receiving a print job by communication with the outside and accumulating the print job in the storage section 15. Accumulation may also be referred to as storage or saving. The print job includes image data representing image of a print target, such as the object 32. The print job may be incident by print setting information for image printing. In the present embodiment, the "accompanying" indicates a state in which other data is accompanying a certain data or file, or a state in which other data is included. The print setting information accompanying the print job corresponds to "incidental setting information". The image data is, for example, generated in a format such as Portable Document Format (PDF). The incidental setting information is, for example, information described in a format such as a Job Definition Format (JDF).

The incidental setting information may be, for example, a part of the information described in a header of the image data included in the print job.

Since the print data is obtained by converting the image data of the print job into a format used for printing by the printing section 18, the image data and the print data may not be particularly distinguished from each other. This conversion is a known process such as a color conversion process or a halftone process. Referring to the example of FIG. 2, the print data is data that defines eject or non-eject of the dot for each pixel and for each CMYK ink. Printing the image based on the image data (print data) of the print job is also simply referred to as printing the print job.

In FIG. 3, step S100 is described as one step in the flowchart, but in practice, the print job is transmitted to the printing device 10 at an arbitrary timing of the user who operates the external device, and the job accumulation section 12a accumulates the print job in the storage section 15 every time the communication IF 16 receives a print job. First, the job accumulation section 12a registers the print jobs accumulated in the storage section 15 in the "print waiting list". The job accumulation section 12a manages the status of the print job, such as waiting to be printed or already printed, using the print waiting list or an "already printed list".

The designation receiving section 12b receives the designation of a "first print mode" or a "second print mode" for one or more print jobs accumulated in the storage section 15 (step S110). In the present embodiment, a consumption amount of medium 30 in printing one print job in the second print mode is larger than a consumption amount of medium 30 in printing one print job in the first print mode. More specifically, the first print mode is a print mode for a "test print" of the image on the medium. 30, and the second print mode is a print mode for an "actual print" for outputting a print result product as a commercial product. The user can perform the test print of a certain print job, confirm the print result, and then perform the actual print of the print job.

Figure 4:
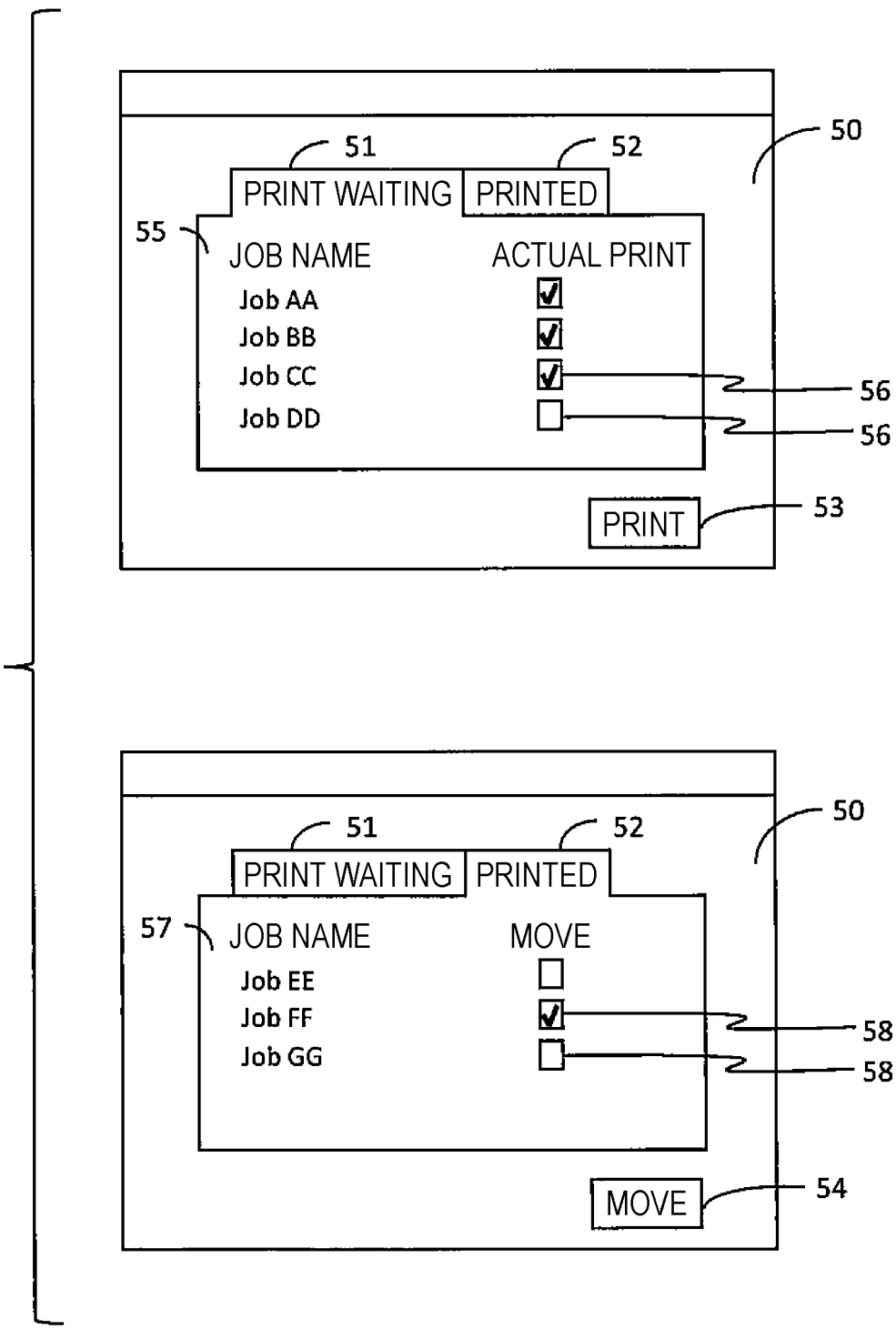
FIG. 4 is a diagram showing an example of the management screen.

FIG. 4 shows an example of a management screen 50 of the print job as a type of UI screen displayed on the display section 13 by the control section 11. According to FIG. 4, the management screen 50 includes a print waiting tab 51, a printed tab 52, a print button 53, a job move button 54, and the like. The user can switch the display contents of the management screen 50 by arbitrarily selecting and operating the print waiting tab 51 and the printed tab 52. The print waiting tab 51 is a tab for displaying a current print waiting list 55, and the printed tab 52 is a tab for displaying a current printed list 57.

In the upper part of FIG. 4, the print waiting tab 51 is selected and the print waiting list 55 is displayed, and in the lower part of FIG. 4, the printed tab 52 is selected and the printed list 57 is displayed. The print waiting list 55 is basically a list of print jobs that have not yet become the target of printing. Further, in the print waiting list 55, basically, the print job transmitted earlier from the external device is displayed at the top of the list. For example, the print jobs such as print job AA, print job BB, print job CC, and print job DD are registered in this order in the print waiting list 55. The printed list 57 is a list of print jobs that have been printed. The job accumulation section 12a deletes print jobs that have been printed from the print waiting list 55, and registers them in the printed list 57. For example, the print jobs such as print job EE, print job FF, and print job GG are registered in the printed list 57.

The user can also arbitrarily select a print job in the printed list 57 and return it to the print waiting list 55. As shown in FIG. 4, selection sections 58 as check boxes are displayed one for each print job in the printed list 57. The user operates the operation receiving sections 14 to place a check in the selection section 58 corresponding to the print job desired to be returned from the printed list 57 to the print waiting list 55, thereby setting it to a selection state, and then presses the job move button 54. In response to this operation, the job accumulation section 12a deletes the print job selected in the printed list 57 from the printed list 57, and registers the print job in the print waiting list 55 again. Accordingly, the print waiting list 55 may include print jobs that have been printed one or more times.

As shown in FIG. 4, selection sections 56 as check boxes are displayed one for each print job in the print waiting list 55. The user operates the operation receiving section 14 to check the selection section 56 corresponding to the print job of an actual print target among the print jobs in the print waiting list 55 to set the selection section 56 to a selected state. In the print waiting list 55, a print job in a non-selection state in which the selection section 56 is not checked is a test print target. In the example of FIG. 4, the print job AA, the print job BB, and the print job CC are actual print targets, and the print job DD is a test print target.

That is, the designation receiving section 12b receives the designation of the second print mode or the first print mode for each print job according to the presence or absence of a selection in each selection section 56 of the print waiting list 55. In such a state, when the print button 53 is pressed by the user's operation, the designation of the first print mode or the second print mode for each print job in the print waiting list 55 is determined, and the process proceeds from step S110 to step S120. As can be understood from the description related to FIG. 4, the user can set one print job stored in the storage section 15 to be test print targets any number of times, and can set the print job to be actual print targets any number of times.

Figure 5:
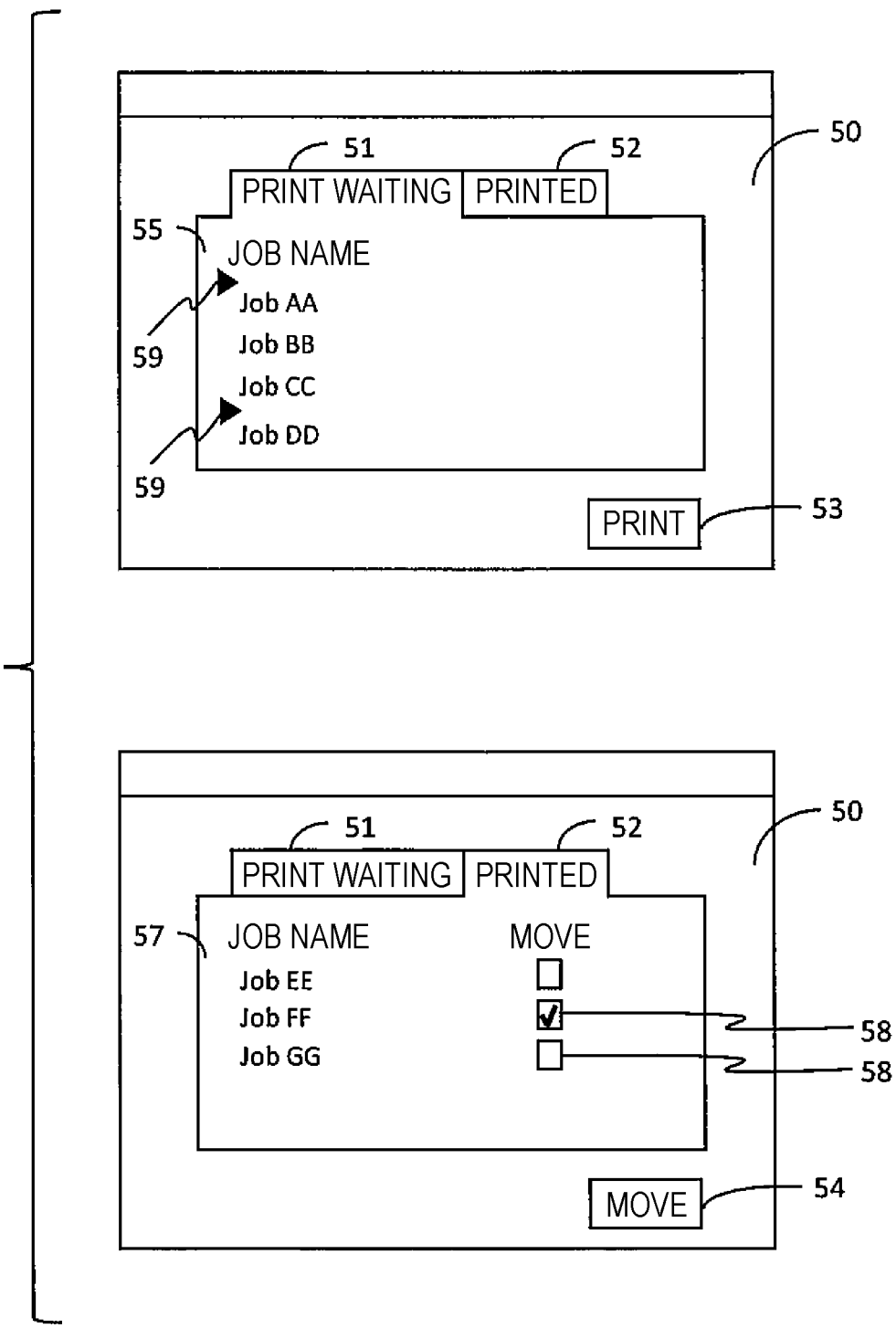
FIG. 5 is a diagram showing an example of a management screen different from that of FIG. 4.

FIG. 5 shows another example, one different from that shown in FIG. 4, of the management screen 50 of the print job displayed on the display section 13 by the control section 11. As for FIG. 5, description common to FIG. 4 is omitted. The management screen 50 of FIG. 5 is different from the management screen 50 of FIG. 4 in the way of selecting actual print or test print for the print jobs.

The user can operate the operation receiving section 14 to input a position mark 59 to select the range of print jobs in the print waiting list 55 that are desired to be actual print targets. In the example of FIG. 5, in the print waiting list 55, the print job AA, the print job BB, and the print job CC are sandwiched by the position marks 59 to form a selection range, and are actual print targets. In the print waiting list 55, the print job DD which is not included in the selection range by the position mark 59 is a test print target. As described above, with respect to the print waiting list 55, the designation receiving section 12b receives the state not included in the selection range input by the user as designation of the first print mode, and receives the state included in the selection range as designation of the second print mode. In such a state, when the print button 53 is pressed the designation of the first print mode or the second print mode for each print job in the print waiting list 55 is determined, and the process proceeds from step S110 to step S120.

It goes without saying that the design of the position mark 59 is not limited to the triangular design as shown in FIG. 5. The display for selecting the range of the print job to be actual print targets may not be the position mark 59, but may be easily understandable characters such as "actual print start" or "actual print end", or may be a difference in background color in the management screen 50.

In step S120, the setting information acquisition section 12*c* acquires print setting information necessary for print setting for each print job registered in the print waiting list 55 at the time when the print button 53 is pressed. The print setting information includes, for example, information on the number of print copies to be printed, information on the margin amount to be secured in the medium 30, information on color setting such as color or monochrome, information on the type of medium, information on the printing order of the print job, information indicating the presence or absence of printing for "post-process", information indicating the presence or absence of printing of the header and/or footer of the print job, and the like. A post-process is a process performed by a post-processing machine on the medium 30 after the print job is printed, and includes various kinds of processes such as label die punching of the label paper, cutting of the medium 30 to form a cutting line (slit), and lamination of the medium 30. Details of the post-processes will be described later.

In the present embodiment, "specific setting information" is print setting information that causes a difference in the consumption amount of the medium 30 between printing in the first print mode, that is, the test print, and printing in the second print mode, that is, the actual print, and the acquisition source for "specific setting information" is different for print jobs in which the first print mode is designated and for print jobs in which the second print mode is designated. Among the above described print setting information, for example, information about the number of print copies to be printed, information of the margin amount, information indicating the presence or absence of printing for post-process, and information indicating the presence or absence of printing of the header and/or footer of the print job correspond to the specific setting information.

FIG. 6 shows in table format a combination of acquisition source of specific setting information for a print job for which the first print mode is designated and acquisition source of specific setting information for a print job for which the second print mode is designated. According to FIG. 6, there are five combinations indicated by combination numbers 1 to 5. In the present embodiment, any of the combination numbers 1 to 5 may be adopted.

First Embodiment

According to the first embodiment, which adopts the combination number 1, the setting information acquisition section 12*c* acquires, from the "initial setting information", the specific setting information for the print job in which the first print mode is designated while acquiring, from the incidental setting information of the print job, the specific setting information for the print job in which the second print mode is designated. The initial setting information includes specific setting information for the test print and is stored in advance in the storage section 15 separately from the print job and the like. Since the test print is printing for confirming the quality of the print result before the actual print, basically, one print copy for one print job is sufficient. Therefore, the number of print copies=1 is set in the initial setting information. Referring to the example of FIG. 2, printing one copy means printing on one frame 31. Therefore, when printing two or more copies of a print job, the same printing is repeated on two or more frames 31.

From the viewpoint of cost suppression, it is desirable to suppress consumption of the medium 30 as much as possible in the test print. Therefore, the initial setting information is set to no margin. Here, the margin is a margin in the transport direction D2 between the image of the print job and the image of another print job, and "no margin" does not mean completely zero margin. When two print jobs are test printed, a minimum margin as an initial value is secured between the two print jobs so that the images of the two print jobs are not connected to each other on the medium 30, and "no margin" means that no extra margin exceeding the initial value is provided.

Further, the post-process is not required in the test print, and printing of the header or footer of the print job is often not required. Therefore, according to the initial setting information, it is directly or indirectly instructed that printing for post-process is not executed or that printing of the header and footer of the print job is not executed. It is only necessary to know from the initial setting information that there is no printing of the margin, no printing for post-process, or no printing of the header or footer of the print job. Therefore, it does not matter in what manner the initial setting information indicates or suggests that there is no margin, no printing for post-process, or no printing of the header or footer of the print job. For example, the initial setting information may indicate that there is no margin, no printing for the post-process, or no printing of the header and the footer of the print job when there is no information regarding the margin, no information regarding the post-process, and no information regarding the header and the footer of the print job. On the other hand, if it is desirable to print the information about the margin, the information about the post-process, or the information about the header or footer of the print job in the test print, then instructions to print the information about the margin, the information about the post-process, or the information about the header or footer of the print job can be described directly in the initial setting information.

According to the first embodiment, each of the print jobs stored in the storage section 15 has incidental setting information and the incidental setting information includes specific setting information described in advance for the actual print of the corresponding print job.

FIG. 7 example shows an example of an incidental setting information 40 of one print job. The incidental setting information 40 describes the specific setting information for the actual print, but may also include print setting information other than the specific setting information.

According to FIG. 7, the project number is described in the incidental setting information 40 as a number for managing the print job. The incidental setting information 40 describes a due date of the print result product of the print job to a delivery destination and a file name of an image file. The image file is image data of the print job. Further, the incidental setting information 40 describes information for each of the number of print copies, the front margin and the rear margin, a primary post-process, and a secondary post-process corresponding to the specific setting information. In the example of FIG. 7, the number of print copies=30 copies, which is the number of print copies necessary for delivery and is larger than one copy of the test print. The front margin is a margin amount to be secured at the downstream side of the image of the print job, and the rear margin is a margin amount to be secured at the upstream side of the image of the print job.

The primary post-processing is a post-process that is first executed on the medium 30 after printing and the incidental setting information 40 describes, for example, that a post-processing machine named XXX should be set with a blade die aaa and executed. The secondary post-process is a post-process that is executed on the printed medium 30 next after the primary post-process and the incidental setting information 40 describes, for example, that it should be executed with the setting of a number of slits=2 by using a post-processing machine called YYY. Here, XXX means a certain die-punching machine for die punching labels, and YYY means a certain slitter. A die-punching machine is a machine that die punches labels of label paper in accordance with the shape of the object, and does not cut the release paper. On the other hand, the slitter is a machine for slitting and cutting the medium 30 including the release paper. Further, as an example of the post-processing machine, there is a post-processing machine having a plurality of functions, for example, a function of die punching the label and a function of slitting and cutting the label. In the case of using die punching and slitting of the label by using such a post-processing machine, as information relating to the primary post-process, the post-processing machine to be used, the type of the blade die when label die punching, and the number of slits when slitting and cutting the label are described. As a result, since die punching and slitting of the label are completed in the primary post-process, the secondary post-process becomes unnecessary, and the information for the secondary post-process becomes unnecessary.

Each set of information about the primary post-process and the secondary post-process corresponds to "post-process setting information". Further, the post-process setting information can be said to be information indicating that "printing for post-process" is present. Furthermore, in the present embodiment, the project number, the due date, and the like of the print job are printed as a header and footer by the actual print. Therefore, it can be said that the information such as the project number and the due date included in the incidental setting information 40 is information indicating that "printing of the header and/or footer of the print job" exists. It is not necessary to print both the header and the footer in the actual print, and only one of them may be printed, or neither of them may be printed.

Second Embodiment

According to the second embodiment, which adopts the combination number 2, the setting information acquisition section 12c acquires the specific setting information for the print job in which the first print mode is designated from the initial setting information. On the other hand, the specific setting information for the print job for which the second print mode is designated is stored in the predetermined folder, and is acquired from a "second setting information file", which is a file different from any of the initial setting information, the incidental setting information, and a "first setting information file" (to be described later). The initial setting information is as described in the first embodiment.

The second setting information file is stored in, for example, a shared folder included in the storage section 3 of the information processing device 1. That is, the user can generate a desired second setting information file and store it in the shared folder. The setting information acquisition section 12c accesses the shared folder of the information processing device 1 via the communication IF 16, refers to the stored second setting information file, and acquires, from the second setting information file, the specific setting information corresponding to the print job for which the actual print is designated. The shared folder is not limited to being provided in the information processing device 1 as an external device and may be provided in the storage section 15 of the printing device 10. The second setting information file and the first setting information file (to be described later) may be a text file or a table format file. The second setting information file and the first setting information file are files generated in a format such as Comma Separated Value (CSV).

FIG. 8 shows an example of a second setting information file 41. The second setting information file 41 describes specific setting information for the actual print, but may also include print setting information other than the specific setting information. As described above, the incidental setting information 40 is information necessary for an actual print of one print job corresponding to the incidental setting information 40. It may generally be understood that the second setting information file 41 is data in which incidental setting information corresponding to each of the plurality of print jobs is collected. According to the example of FIG. 8, in the second setting information file 41, the specific setting information for the actual print is described corresponding to each of the print job AA, the print job BB, the print job FF, and the print job CC. The description for content of the specific setting information corresponding to one print job in the second setting information file 41 is the same as the description for content of the incidental setting information 40, and thus will be omitted.

Third Embodiment

According to the third embodiment, which adopts the combination number 3, the setting information acquisition section 12c acquires, from the incidental setting information, the specific setting information for the print job in which the first print mode is designated while acquiring, from the second setting information file, the specific setting information for the print job in which the second print mode is designated. The second setting information file is as described in the second embodiment.

In the first embodiment, with reference to FIG. 7, the specific setting information for the actual print of the corresponding print job is described in the incidental setting information included in the print job stored in the storage section 15, but in the third embodiment, the specific setting information for the test print of the corresponding print job is described in the incidental setting information included in the print job. The specific setting information for the test print is the same as the initial setting information. That is, each of the print jobs stored in the storage section 15 may be incident by substantially the same initial setting information. In the third embodiment, instead of providing incidental setting information corresponding to each print job, common (one set of) incidental setting information may be provided corresponding to all print jobs.

Fourth Embodiment

According to the fourth embodiment, which employs the combination number 4, the setting information acquisition section 12c acquires the specific setting information for the print job in which the first print mode is designated from the first setting information file, which is stored in the predetermined folder and is a file different from both the initial setting information and the incidental setting information. On the other hand, specific setting information for the print job for which the second print mode is designated is acquired from the incidental setting information of the print job. The description of acquiring the specific setting information for the print job for which the second print mode is designated from the incidental setting information is the same as that of the first embodiment.

The first setting information file is stored in the above described shared folder. The setting information acquisition section 12c accesses the shared folder of the information processing device 1 via the communication IF 16, refers to the stored first setting information file, and acquires the specific setting information for a test print. When viewed from the setting information acquisition section 12c, the first setting information file is different from the initial setting information in the storage location as an information source, but the content of the information is the same as the initial setting information.

Fifth Embodiment

According to the fifth embodiment, which adopts the combination number 5, the setting information acquisition section 12c acquires the specific setting information for the print job in which the first print mode is designated from the first setting information file as in the fourth embodiment, while acquiring the specific setting information for the print job in which the second print mode is designated from the second setting information file as in the second embodiment and the third embodiment.

In any of the first to fifth embodiments, the setting information acquisition section 12c may acquire the setting information other than the specific setting information among the print setting information necessary for printing the print job from the same acquisition source as the specific setting information, or may acquire the setting information from an acquisition source different from the specific setting information, for example, by input of the user.

As described above, the specific setting information for the actual print includes the post-process setting information indicating the setting of the post-process to be executed on the medium 30 on which the image based on the image data of the print job is printed. In the first embodiment or the fourth embodiment, the specific setting information for the actual print is described in the incidental setting information of the print job, and in each of the second embodiment, the third embodiment, and the fifth embodiment, the specific setting information for the actual print is described in association with the print job in the second setting information file. Therefore, in the present embodiment, it can be said that the print job is associated with the post-process setting information.

In step S130, the print setting section 12d performs the print setting of the print job for which the first print mode is designated in accordance with the print setting information including the specific setting information acquired in step S120 for the print job for which the first print mode is designated. In the present embodiment, for the first print mode, it is assumed that the number of print copies=1 is set as the specific setting information, and it is described that printing of the margin, printing for post-process, and printing of the header and footer are all not performed. Therefore, for a print job for which test print is designated, the number of print copies=1 is set, and printing of margin, printing for post-process, and printing of header and footer are all set to none. In addition, the print setting section 12d performs the print setting of each print job for which the second print mode is designated in accordance with the specific setting information acquired in step S120 for each print job for which the second print mode is designated. That is, for a print job for which the actual print is designated, the number of print copies, the margin amount, the contents of printing for post-process, and the contents of printing of the header and footer are set according to the specific setting information corresponding to the print job.

The process for setting the contents of printing for post-process includes a "post-process comparison and determination process" for determining whether or not it is necessary to change the setting of a post-process by comparing the post-process setting information of the print jobs for which actual print is designated. Depending on the result of the post-process comparison and determination process, the content of printing for post-process may change, or a part of printing for post-process may not be executed. Details of the post-process comparison and determination process will be described later.

The print setting section 12d performs print setting for each print job in accordance with setting information other than the specific setting information among print setting information necessary for printing the print job. Naturally, the image data of the print job is converted into the print data. Since printing of a print job is a process executed by the printing section 18, it can be said that step S130 is a step of performing print setting for the printing section 18 based on the print setting information.

In step S140, the print control section 12e causes the printing section 18 to execute printing according to the print setting for each print job for which the print setting has been made in step S130. That is, in the case of the print job in which the first print mode is designated, it causes the printing section 18 to execute the test print, and in the case of the print job in which the second print mode is designated, it causes the printing section 18 to execute the actual print according to the print setting. Among the print jobs registered in the print waiting list 55, the job accumulation section 12a deletes from the print waiting list 55 the registration of the print job for which printing in step S140 completed and registers the print job in the printed list 57. That is, the print job for which printing has been completed is moved from the print waiting list 55 to the printed list 57. Thus, the flow chart of FIG. 3 is ended.

With respect to the flow of the processing in steps S110 to S140, an example different from the example described above will be described with reference to FIGS. 9 and 10.

In the embodiment to be described with reference to FIGS. 9 and 10, the acquisition source of the specific setting information for the print job in which the second print mode is designated is limited to the second setting information file. That is, in the embodiment described with reference to FIGS. 9 and 10, the combination numbers 1 and 4 of FIG. 6 are not necessary. The acquisition source of the specific setting information for the print job for which the first print mode is designated may be any of the initial setting information, the incidental setting information, and the first setting information file.

Figure 9:
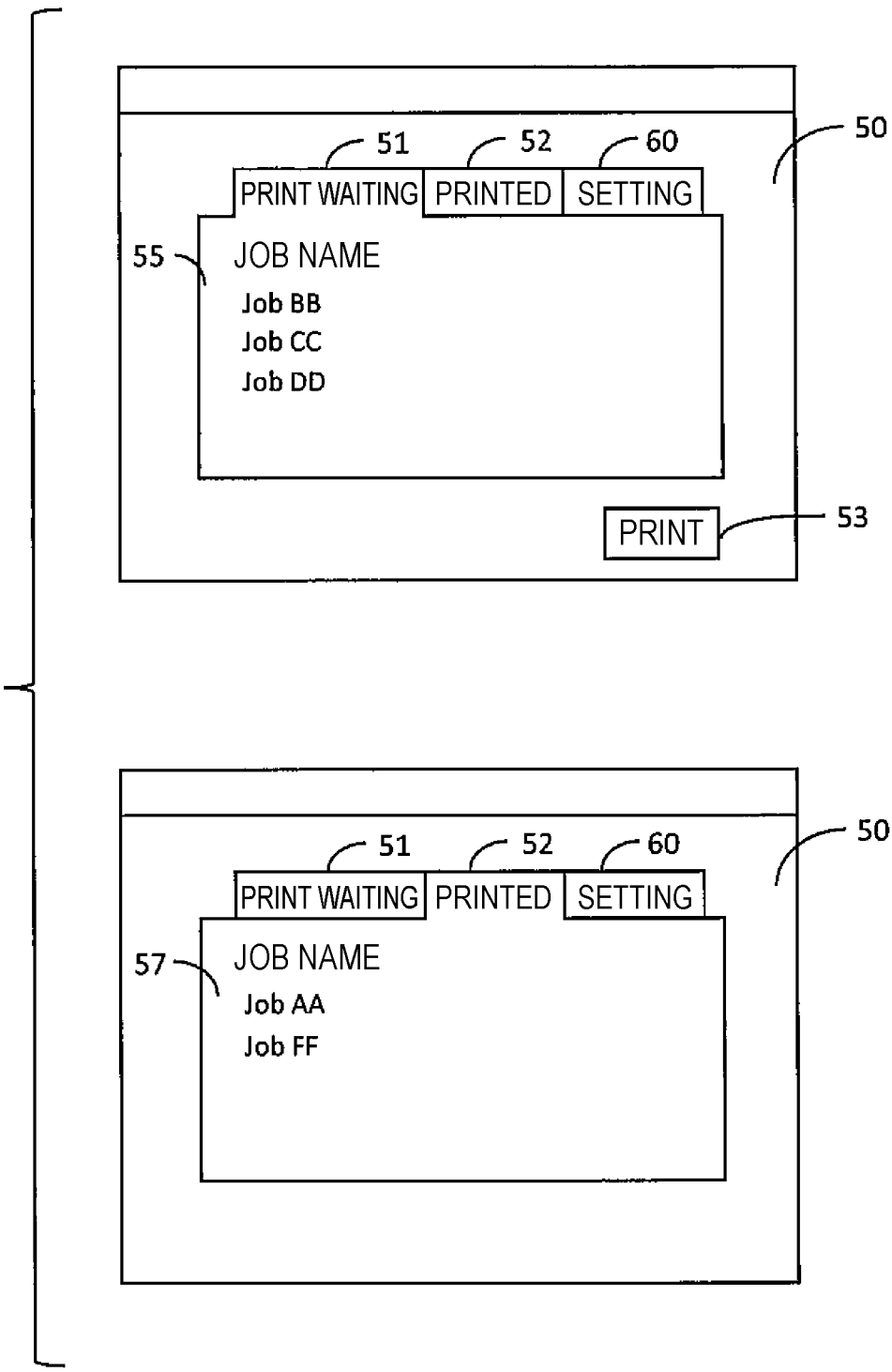
FIG. 9 is a diagram showing an example of a management screen having a setting tab.
Figure 10:
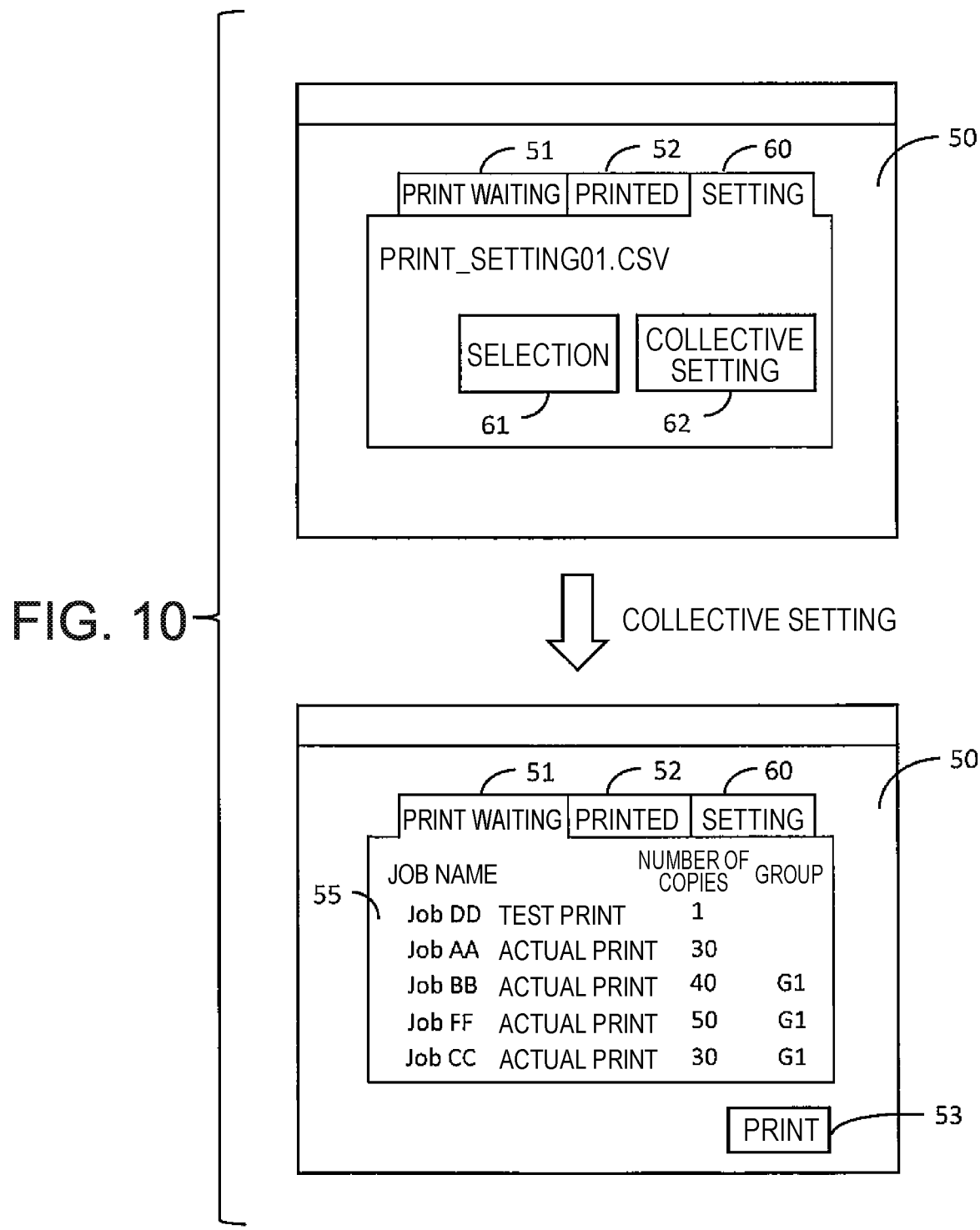
FIG. 10 is a diagram showing an example of a management screen having a setting tab.

FIGS. 9 and 10 show another example of the management screen 50 of the print job displayed on the display section 13 by the control section 11, which is a different from that of FIGS. 4 and 5. According to the examples of FIGS. 9 and 10, the management screen 50 has a setting tab 60 in addition to the print waiting tab 51 and the printed tab 52. The user can arbitrarily select and operate the setting tab 60.

The upper and lower part of FIG. 9 show the print waiting list 55 displayed on the management screen 50 when the user selects the print waiting tab 51, and a printed list 57 displayed on the management screen 50 when the user selects the printed tab 52. As shown in FIG. 9, the print job BB, the print job CC, and the print job DD are registered in the print waiting list 55, and the print job AA and the print job FF are registered in the printed list 57. Although description is omitted, also in the management screen 50 shown in the lower part of FIG. 9, the print job can be moved from the printed list 57 to the print waiting list 55 by the operation of the selection section 58 or the job move button 54.

According to the upper part of FIG. 10, the setting tab 60 is selected, and as a result, a selection button 61 and a collective setting execution button 62 are displayed on the management screen 50. The user can select the second setting information file by operating the selection button 61. One or more second setting information files are stored in the above described shared folder. When the selection button 61 is operated, the control section 11 accesses the shared folder and presents each of the second setting information files stored in the shared folder to the user so as to be visually recognizable on the management screen 50. The user performs a predetermined operation of arbitrarily selecting one of the presented second setting information files. The setting information acquisition section 12c acquires the second setting information file selected by the user from the shared folder. As a result, in the upper part of FIG. 10, the second setting information file having a file name of "print setting 01" is acquired. Here, it is assumed that the second setting information file having the filename "print setting 01" is the second setting information file 41 shown in FIG. 8.

In this way, in a state where the second setting information file 41 is selected, the user touches and operates the collective setting execution button 62. When the collective setting execution button 62 is operated, steps S110 to S130 are automatically executed. The designation receiving section 12b receives the designation of the first print mode or the second print mode for the print job accumulated in the storage section 15 according to the selected second setting information file 41 (step S110). According to the second setting information file 41, specific setting information for the actual print is described for the print job AA, the print job BB, the print job FF, and the print job CC. Therefore, as shown in FIG. 9, the designation receiving section 12b recognizes that the designation of the second print mode is collectively received for the print job AA, the print job BB, the print job FF, and the print job CC described in the second setting information file 41 among the print job BB, the print job CC, the print job DD, the print job AA, and the print job FF currently registered in the print waiting list 55 or the printed list 57. The designation receiving section 12b recognizes that the designation of the first print mode has been received for the print job DD registered in the print waiting list 55 but not described in the second setting information file 41.

According to this description, the collective setting execution button 62 corresponds to a "collective receive button" for collectively receiving the designation of the second print mode for the plurality of print jobs. When the UI screen such as the management screen 50 and at least a portion of the operation receiving section 14 are regarded as a part of the designation receiving section 12b, the designation receiving section 12b of the printing device 10 can be said to have the collective setting execution button 62.

The setting information acquisition section 12c acquires the specific setting information for the print job DD in which the first print mode is designated as described above, and acquires the specific setting information for the print job AA, the print job BB, the print job FF, and the print job CC in which the second print mode is designated from the second setting information file 41 (step S120). Step S130 has already been described.

When the control section 11 executes steps S110 to S130 in response to the operation of the collective setting execution button 62, the control section 11 also displays at least a part of the contents of the print settings for each print job in the print waiting list 55 of the management screen 50 as shown in the lower part of FIG. 10. Here, by the operation of the collective setting execution button 62, the print job BB and the print job CC registered in the print waiting list 55 and the print job AA and the print job FF registered in the printed list 57 are designated as second print mode targets according to the second setting information file 41. Therefore, with respect to the print job AA, the print job BB, the print job FF, and the print job CC, the fact that they are to be actual prints, the number of print copies of each actual print, and the like are displayed in the print waiting list 55. In addition, since the first print mode is designated for the print job DD that was registered in the print waiting list 55, the fact that the print job DD is the test print and the number of print copies=1 are displayed in the print waiting list 55.

Further, as shown in the print waiting list 55 in the lower part of FIG. 10, the control section 11 also displays the print order of each print job for which the second print mode is designated and the classification of the "collective print job group" which is a group in which some common items are grouped according to the second setting information file 41. The printing order is predetermined in accordance with a request of the user or a customer, and is defined in the second setting information file 41. That is, the description order of the print job AA, the print job BB, the print job FF, and the print job CC in the second setting information file 41 shown in FIG. 8 means the order when the print job AA, the print job BB, the print job FF, and the print job CC are printed in actual print. As can be seen from comparison between FIGS. 9 and 10, the order of the actual print print jobs displayed in the print waiting list 55 after the collective setting execution button 62 is operated is irrelevant to the order of the print jobs displayed in the print waiting list 55 or the printed list 57 before the operation, and follows the description order of the print jobs in the second setting information file 41.

In the second setting information file 41, it is defined in advance that the print jobs BB, FF, and CC belong to a group G1 as a classification example of the collective print job group. Therefore, the print waiting list 55 in the lower part of FIG. 10 indicates that the print jobs BB, FF, and CC belong to the group G1. In this way, the control section 11 sets two or more print jobs designated from among the plurality of print jobs stored in the storage section 15 as the collective print job group.

Collective print job group means a set of print jobs to be continuously printed in the form of an actual print on the common roll body. This is because there is a demand for the plurality of specific print jobs to be, for example, printed on a common medium type, delivered the print result product to the same delivery destination, shipped the print result product to the same place of destination, or by the same due date. At least one of the objects, conditions, and elements such as the roll body, the medium type, the delivery destination, the place of destination, and the due date is a specific example of the above-described common item. Therefore, different collective print job groups can be printed on different roll bodies. However, it is also possible to instruct the different collective print job groups to be printed on the same roll body, stop printing each time printing of one collective print job group is completed, cut and separate the print result product, and then execute printing of the next collective print job group.

Alternatively, the different collective print job groups may be printed on the same roll body, and in the middle of the post-process, each time the post-process for one collective print job group is completed, the print result product may be cut and separated, and then the post-process for next collective print job group may be executed. Although the collective print job group basically includes two or more print jobs, a single print job can be designated as one collective print job group for the purpose of printing roll information (to be described later). However, this case is not regarded as the collective print job group to which the post-process comparison and determination process (to be described later) is applied in a "first print embodiment" and a "second print embodiment" (to be described later). In other words, in the first print embodiment and the second print embodiment, the post-process comparison and determination process is not performed on the collective print job group including only a single printing job.

After the collective setting execution button 62 is operated, by displaying the print waiting list 55 shown in FIG. 10, the user can easily understand the printing of each print job to be executed. There is no concept of the collective print job group in the test print.

In the management screen 50 shown in the lower part of FIG. 10, when the user operates the print button 53, the process proceeds to step S140, and in step S130 the printing control section 12e causes the printing section 18 to execute printing according to the print setting in the printing order for each print job for which the print setting is performed. The print control section 12e test prints, either before or after actual print, print jobs that are different from actual print print jobs, that is, that are indicated as a target of test print such as the print job DD shown in FIG. 10. That is, the print result product of the test print is prevented from entering between the print result products of the actual print. In addition, for the print job for which the first print mode is designated, that is, the print job for which test print was performed, it is desirable to separate the print result product from the roll body each time printing of the corresponding print job is completed. In particular, if the test print is performed before the actual print, it is possible to quickly confirm or inspect the print result product.

The concept of the collective print job group can also be applied in the examples of FIGS. 4 and 5. When the print button 53 is operated on the management screen 50 shown in the upper part of FIG. 4 or the management screen 50 shown in the upper part of FIG. 5, the print job AA, the print job BB, and the print job CC for which the second print mode is designated at that time may constitute one collective print job group, and the print job DD for which the first print mode is designated may be a test print target.

The designs of the management screen 50 in the figures are merely examples. For example, without selecting the tabs 51, 52, and 60, the displays corresponding to the tabs 51, 52, and 60 may be designed to be visible at the same time while changing in the screen. The buttons 53, 54, 61, and 62 in the management screen 50 are buttons on the touch panel, but at least some of the buttons may be physical buttons.

3. Specific Example of Printing

Next, the present embodiment will be further described with reference to a specific example of the print result product obtained by the flowchart of FIG. 3. Depending on the position and/or the timing at which the printed result product is cut, the printed content of the printed result product may partially differ. "Cutting" herein refers to an operation of separating the print result product into a different roll body, and does not include an operation of separating the test print from the print result product, an operation of cutting the print result product by the slitter, or an operation of separating the roll information (to be described later) from the print result product.

3.1. First Print Embodiment

Figure 11:
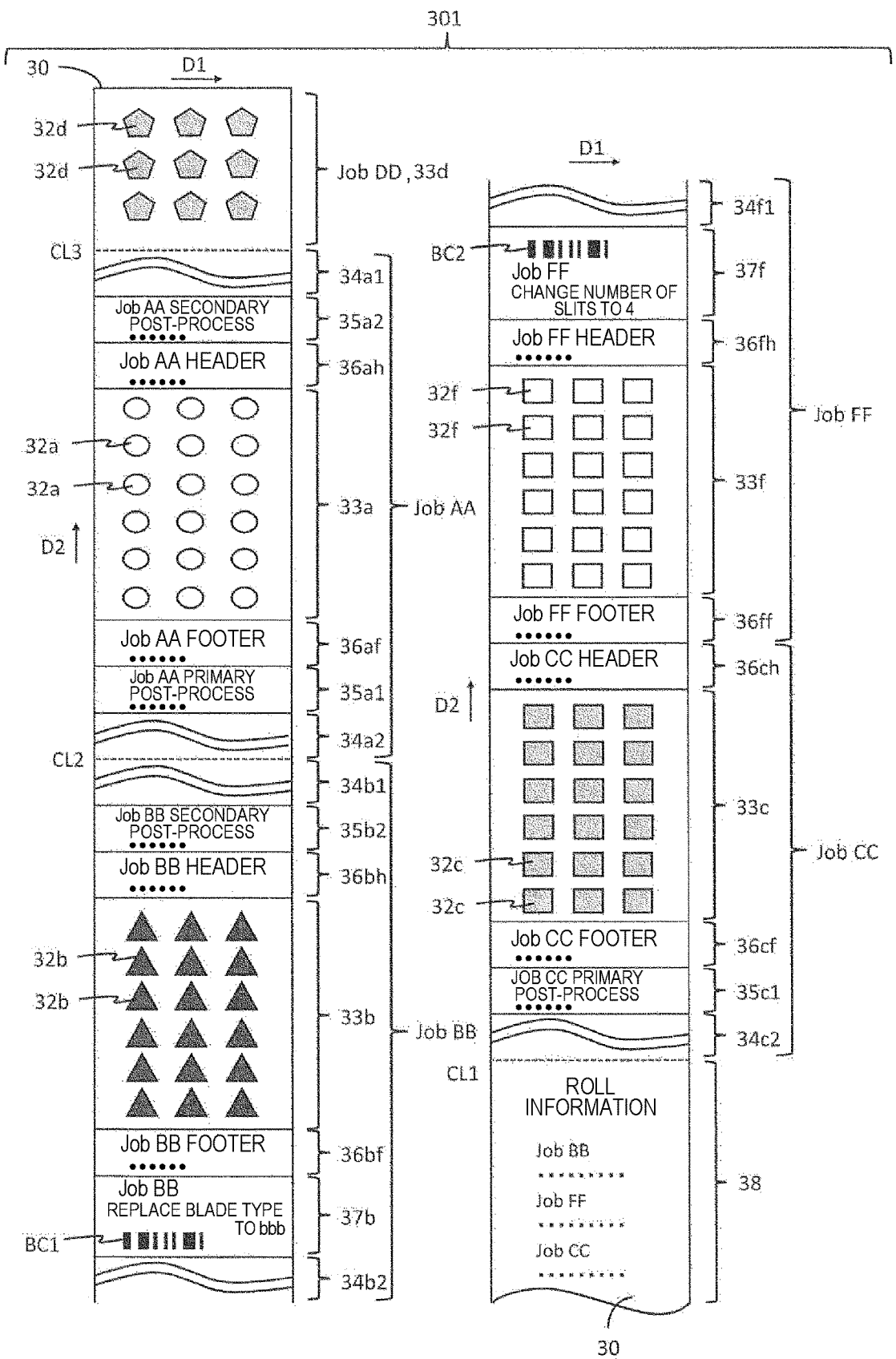
FIG. 11 is a view showing a print result product for describing a first print embodiment.

In the first print embodiment, the print result product is cut at the timing of when the primary post-process is performed on the print result product and at the boundary of each printing job, and separated into the respective roll bodies. However, the plurality of print jobs specified in the collective print job group are regarded as one bunch of print jobs, and the plurality of print jobs included in the collective print job group are separated as one roll body. FIG. 11 shows an example of the medium 30 printed under the control of the control section 11. In FIG. 11, although the medium 30 is shown divided into right and left portions due to space limitations, the medium 30 divided into right and left portions is a single contiguous elongated medium 30. In FIG. 11, the medium 30 on the left is the downstream portion of the single contiguous medium 30, and the medium 30 on the right is the upstream portion of the single contiguous medium 30. The medium 30 shown in FIG. 11 is referred to as a print result product 301. As an example, it is assumed that the print result product 301 is obtained by printing the print job DD, the print job AA, the print job BB, the print job FF, and the print job CC in accordance with the print settings displayed on the management screen 50 in the lower part of FIG. 10.

In the following description of FIGS. 11, 12, and 13A, the management screen 50 in the lower part in FIG. 10 is simply referred to as the management screen 50. According to the management screen 50, first, the print job DD is test printed on the medium 30. The image data of the print job DD represents one frame worth of objects 32d, and the image 33d for one frame is printed on the medium 30 based on the image data of the print job DD. That is, one copy of the image 33d is printed as the test print. In the description of the print result product 301, it is assumed that a bunch of a total of nine objects in the vertical and horizontal 3×3 corresponds to an image of the number of print copies=1.

According to the management screen 50, following the test print of the print job DD, the print job AA, the print job BB, the print job FF, and the print job CC are the actual printed in this order. Among them, the print job AA does not form the collective print job group, and the print job BB, the print job FF, and the print job CC form the collective print job group. Cutting lines CL1, CL2, and CL3 indicated by dashed lines in the print result product 301 are lines for cutting the print result product 301 at the above-described timing. Such a cutting line may be printed on the medium 30 together with the print job or the like, or may not actually exist. The cutting line CL3 is a boundary between a region corresponding to the print job DD and a region corresponding to the print job AA. The cutting line CL2 is a boundary between a region corresponding to the print job AA and a region corresponding to the print job BB. The cutting line CL1 is a boundary between the region corresponding to the print job CC and the print region of a roll information 38.

Although the solid line parallel to the width direction D1 shown in the print result product 301 is a line for dividing each region of the medium 30 for easy understanding, such a solid line may be printed on the medium 30 together with the print job or the like, or may not actually exist.

Reference symbol 34*a*1 indicates a front margin 34*a*1 of the print job AA, and the reference symbol 34*a*2 indicates a rear margin 34*a*2 of the print job AA. As a matter of course, the front margin and the rear margin on the medium 30 are regions secured by adjusting the transport amount of the transport section 17 according to the specific setting information of the corresponding print job. In FIG. 11, due to space constraints, the front margin 34*a*1, the rear margin 34*a*2, and other margins are represented in a shorter size than the actual size in the transport direction D2.

Secondary post-process information 35*a*2, which is post-process setting information for a secondary post-process of the print job AA, is printed on the upstream side of the front margin 34*a*1, and a header 36*ah* of the print job AA is printed on the upstream side of the secondary post-process information 35*a*2 of the print job AA. Primary post-process information 35*a*1, which is post-process setting information for the primary post-process of the print job AA, is printed on the downstream side of the rear margin 34*a*2, and a footer 36*af* of the print job AA is printed on the downstream side of the primary post-process information 35*a*1 of the print job AA. The printing of the secondary post-process information and the primary post-process information is printing for post-process, and the contents thereof are naturally set according to the specific setting information of the corresponding print job. The secondary post-process information and the primary post-process information may be abbreviated and simply described to as post-process information. In the secondary post-process information 35*a*2 and the primary post-process information 35*a*1, as described in connection with FIGS. 7 and 8, what kind of post-processing machine should be used and what kind of post-process should be performed are printed in an easy-to-understand manner. Further, a code image (to be described later) may be printed.

An image 33*a* corresponding to the print job AA is printed between the header 36*ah* and the footer 36*af*. The image data of the print job AA represents one frame worth of objects 32*a*, and the images 33*a* corresponding to a plurality of frames are printed based on the image data of the print job AA. According to the management screen 50, since the number of print copies of the actual print of the print job AA is 30, the image 33*a* is an image corresponding to 30 frames. In FIG. 11, due to space limitations, the image amount of such actual print is represented to be less than the actual amount in the transport direction D2.

As described above, the medium 30 on which printing was performed by the printing section 18 is wound into a roll shape by the winding device (not shown) on the downstream side. Therefore, when a primary post-process is performed on the medium 30, which becomes the roll body again after the printing, then when the medium 30 is fed from the roll body set in the post-processing machine of the primary post-process, the print result product of the printing job of which the printing order is the last will be the target of the primary post-process first. That is, the print job on the upstream side first becomes the target of the primary post-process. In each post-process, the post-process is executed while transporting the medium 30 in a direction in which the medium 30 is fed from the set roll body, and the post-processed medium 30 is wound in the roll shape. Therefore, when the secondary post-process is performed on the medium 30 which becomes a roll body after the primary post-process, in a case where the medium 30 is fed from the roll body set in the post-processing machine of the secondary post-process, the print job on the downstream side becomes the target of the secondary post-process is first.

Considering such circumstances, as shown in FIG. 11, the primary post-process information corresponding to a certain print job is printed on the upstream side of the image of the print job, and the secondary post-process information corresponding to the print job is printed on the downstream side of the image of the print job. However, in a case where the printed roll body wound in the roll shape by the winding device of the printing device 10 is rewound in a direction opposite to the winding direction by using a rewinding machine prepared separately from the printing device 10 and then set in the post-processing machine for the primary post-process, the print job on the downstream side becomes the target of the primary post-process is first, and the print job on the upstream side becomes the target of the secondary post-process is first. Therefore, if the rewinding machine is used, the primary post-process information corresponding to a certain print job is printed on the downstream side of the image of the print job, and the secondary post-process information corresponding to the print job is printed on the upstream side of the image of the print job.

A front margin 34*b*1 of the print job BB is secured upstream following the rear margin 34*a*2 of the print job AA, and a secondary post-process information 35*b*2, which is post-process setting information for the secondary post-process of the print job BB, is printed upstream following the front margin 34*b*1 of the print job BB. Further, a header 36*bh* of the print job BB is printed upstream following the secondary post-process information 35*b*2 of the print job BB. The contents of the header and footer are naturally set in accordance with the specific setting information of the corresponding print job. As described above, the project number, the due date, and the like of the print job are printed as the contents of the header and footer. Further, at least a part of the post-process setting information of the corresponding print job may be printed in the header or the footer.

Reference symbol 34*b*2 indicates a rear margin 34*b*2 of the print job BB. A "setting change instruction" 37*b* for primary post-process of the print job BB is printed on downstream following the rear margin 34*b*2. The setting change instruction is also a kind of printing for post-process. Originally, at this position, the primary post-process information which is the post-process setting information for the primary post-process of the print job BB is printed based on the specific setting information for the print job BB, but the setting change instruction 37*b* is printed in response to the result of the post-process comparison and determination process. The setting change instruction is the print content set as a result of the post-process comparison and determination process. Further, a footer 36*bf* of the print job BB is printed on the downstream side of the setting change instruction 37*b* of the print job BB. An image 33*b* corresponding to the print job BB is printed between the header 36*bh* and the footer 36*bf*. The image data of the print job BB represents one frame worth of objects 32*b*, and the images 33*b* corresponding to a plurality of frames, which is 40 frames according to the management screen 50, are printed based on the image data of the print job BB.

A front margin 34*f*1 of the print job FF is secured upstream following the rear margin 34*b*2 of the print job BB, and a setting change instruction 37*f* for secondary post-process of the print job FF is printed upstream following the front margin 34*f*1. Normally, the secondary post-process information, which is the post-process setting information for the secondary post-process of the print job FF, would be printed at this position based on the specific setting information for the print job FF, but the setting change instruction 37*f* is printed in response to the result of the post-process comparison and determination process. Further, a header 36*fh* of the print job FF is printed upstream following the setting change instruction 37*f* of the print job FF. An image 33*f* corresponding to the print job FF is printed between the header 36*fh* of the print job FF and a footer 36*ff* of the print job FF. The image data of the print job FF represents one frame worth of objects 32*f*, and the images 33*f* corresponding to a plurality of frames, which is 50 frames according to the management screen 50, are printed based on the image data of the print job FF.

A header 36*ch* of the print job CC is printed upstream following the footer 36*ff* of the print job FF. Reference symbol 34*c*2 indicates a rear margin 34*c*2 of the print job CC, and a primary post-process information 35*c*1, which is post-process setting information for the primary post-process of the print job CC, is printed downstream following the rear margin 34*c*2 of the print job CC. A footer 36*cf* of the print job CC is printed downstream following the primary post-process information 35*c*1. An image 33*c* corresponding to the print job CC is printed between the header 36*ch* and the footer 36*cf* of the print job CC. The image data of the print job CC represents one frame worth of objects 32*c*, and the images 33*c* corresponding to a plurality of frames, which is 30 frames according to the management screen 50, are printed based on the image data of the print job CC.

In accordance with the management screen 50, the roll information 38 corresponding to the index of the contents of the group G1 is further printed upstream of the last printed print job CC of the group G1, which is the collective print job group, and printing is completed. That is, the control section 11 controls the printing section 18 to print the roll information at the end of the collective print job group. That is, when a plurality of collective print job groups are printed on the same roll body, the roll information is printed at the end of each collective print job group. The roll information includes all or at least a part of various kinds of information such as the project number, the due date, an image file name, the number of print copies, the margin, and the post-process setting information for each print job as the target of the collective print job group in the printing order of the print jobs or in the reverse order of the printing order of the print jobs. The roll information may be contents of the print job printed on the same roll body. In this case, the roll information is printed only once on the upstream side of the print job printed last among all the jobs printed on the same roll body regardless of whether or not the collective print job group is designated. When the user sets the roll body of the medium 30 wound after printing in the post-processing machine, the user can first see the roll information when pulling out the medium 30 from the roll body.

Next, the post-process comparison and determination process and the printing of the setting change instruction in the first print embodiment will be described with reference to the print result product 301 of FIG. 11. As described above, the print result product 301 printed in the first print embodiment is cut at the timing when the primary post-process is performed on the print result product and at the boundary of each printing job, and separated into the respective roll bodies. When the print job included in each of the separated roll bodies is the actual print, post-process setting information is printed upstream and downstream of the image corresponding to the print job. On the other hand, in the roll body corresponding to the collective print job group including the designated two or more print jobs, the post-process setting information corresponding to the print job located on the most upstream side is printed on the upstream side of the image of the print job located on the most upstream side of the roll body, and the post-process setting information corresponding to the print job located on the most downstream side is printed on the downstream side of the image of the print job located on the most downstream side of the roll body. The information printed between the images of the adjacent print jobs in the two or more print jobs included in the collective print job group has different print contents according to the post-process performed on each of the adjacent print jobs. Therefore, the post-process comparison and determination process is performed on the print jobs included in the collective print job group.

Paying attention to the printing of the group G1 of the management screen 50, i.e., the collective print job group, the printing section 18 sequentially prints each image on the medium 30 based on the image data of each print job belonging to the collective print job group. Here, n is an integer of 1 or more, and among the print jobs belonging to the collective print job group, the image printed on the medium 30 based on the image data of the "n-th print job", which is to be print target n-th by the printing section 18, is referred to as the "n-th image". Similarly, among the print jobs belonging to the collective print job group, an image printed on the medium 30 based on the image data of the "(n+1)-th print job", which is to be the print target (n+1)-th by the printing section 18, is referred to as the "(n+1)-th image".

According to FIG. 11, when n=1, the print job BB corresponds to the n-th print job, the print job FF corresponds to the (n+1)-th print job, the image 33*b* corresponds to the n-th image, and the image 33*f* corresponds to the (n+1)-th image. Since the actually printed image 33*b*, image 33*f*, and the like that are images that include a plurality of objects or correspond to a plurality of number of print copies, they may be called an image group. When n=2, the print job FF corresponds to the n-th print job, the print job CC corresponds to the (n+1)-th print job, the image 33*f* corresponds to the n-th image, and the image 33*c* corresponds to the (n+1)-th image.

The post-process setting information associated with the n-th print job is referred to as "n-th post-process setting information", and the post-process setting information associated with the (n+1)-th print job is referred to as "(n+1)-th post-process setting information". If the print job BB is the n-th print job, the post-process setting information included in the specific setting information acquired in step S120 for the print job BB in which the second print mode is designated corresponds to the n-th post-process setting information. Similarly, when the print job FF is the (n+1)-th print job, the post-process setting information included in the specific setting information acquired in step S120 for the print job FF in which the second print mode is designated corresponds to the (n+1)-th post-process setting information. However, in a third print embodiment (to be described later), in a case of the print job in which the second print mode is designated, a description indicating an order such as "n" or "n+1" is appropriately used in the print job, the image, or the post-process setting information according to the printing order by the printing section 18 regardless of whether or not the print job belongs to the collective print job group.

Figure 12:
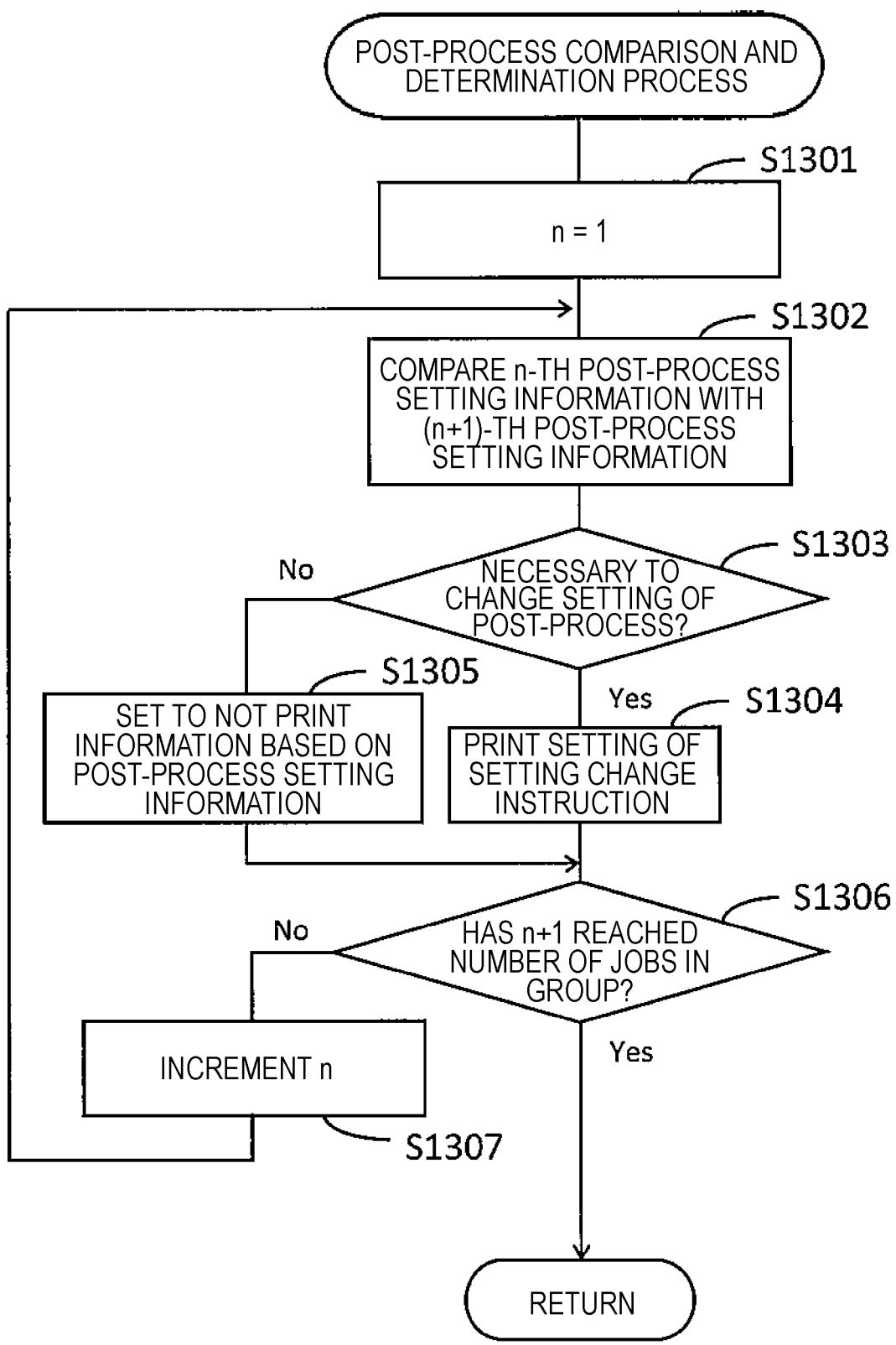
FIG. 12 is a flowchart showing a post-process comparison and determination process according to the first print embodiment.

FIG. 12 is a flowchart showing the post-process comparison and determination process included in step S130. In step S1301, the control section 11 sets n to 1, which is the initial value. In step S1302, the control section 11, by comparing the n-th post-process setting information with the (n+1)-th post-process setting information, determines whether or not the setting of post-process needs to be changed. When it is necessary to change the setting of the post-process, the control section 11 proceeds from the determination of "Yes" in step S1303 to step S1304, and performs setting for causing the printing section 18 to print the setting change instruction of the post-process at a position between the n-th image and the (n+1)-th image on the medium 30 based on the specific setting information of the corresponding print job instead of the post-process information to be originally printed. Then, the process proceeds from step S1304 to step S1306. The reason why the setting change instruction of the post-process is set to be printed instead of the post-process information to be originally printed when it is determined that the setting of the post-process needs to be changed is to easily notify the user who performs the post-process that the setting of the post-process needs to be changed between the nth print job and the (n+1)-th print job.

When it is not necessary to change the setting of the post-process as a result of the comparing in step S1302, the control section 11 proceeds to step S1305 from the determination of "No" in step S1303. In step S1305, the control section 11 changes the print setting so as not to print the post-process information that was originally set to be printed based on the specific setting information of the corresponding print job. This means that no information based on the post-process setting information is printed at the position between the n-th image and the (n+1)-th image on the medium 30. The information based on the post-process setting information includes primary post-process information, secondary post-process information, and a setting change instruction. The reason why the originally set post-process information is changed so as not to be printed when it is determined that the setting of the post-process does not needs to be changed is that the consumption of the medium 30 or ink can be suppressed by omitting the printing for the post-process, and to easily notify the user who performs the post-process that the setting of the post-process needs to be changed between the nth print job and the (n+1)-th print job. After performing step S1305, the control section 11 proceeds to step S1306.

In step S1306, the control section 11 determines whether n+1 has reached the number of print jobs in the collective print job group. According to the management screen 50, the group G1 includes three print jobs of the print job BB, the print job FF, and the print job CC. Therefore, if n=2 at the time of step S1306, n+1=3, and thus the determination result is "Yes", and the flowchart of FIG. 12 ends. If n+1 has not reached the number of print jobs in the collective print job group, the control section 11 proceeds from the determination of "No" in step S1306 to step S1307, increments n, that is, increases the numerical value of n by one, and proceeds to step S1302.

In FIG. 13A, the post-process setting information of each of the print job BB, the print job FF, and the print job CC forming the group G1 are showing by a table 42 for easy comparison. Here, it is assumed that the primary post-process is label die punching, and the secondary post-process is cutting of the medium 30 after label die punching. According to the table 42, in all of the print job BB, the print job FF, and the print job CC, it is set that the post-processing machine XXX is used for label die punching, and the post-processing machine YYY is used for cutting the medium 30. Further, according to the table 42, it is set that label die punching is executed by using the blade die bbb for the print job BB, and label die punching is executed by using the blade die aaa for the print job FF and the print job CC. In addition, for the print job BB, it is set that the cutting of the medium 30 is executed with the number of slits=2, and for the print job FF and the print job CC, it is set that the cutting of the medium 30 is executed with the number of slits=4.

Referring to the table 42, the post-process setting information differs between the print job BB and the print job FF. Therefore, in step S1304 of the flowchart of FIG. 12, the control section 11 performs setting for printing the setting change instruction at a position between the image 33*b* corresponding to the print job BB and the image 33*f* corresponding to the print job FF on the medium 30. On the other hand, according to the table 42, the post-process setting information is the same between the print job FF and the print job CC. Therefore, in step S1305 of the flowchart of FIG. 12, the control section 11 changes the setting so that the post-process information originally set to be printed at a position between the image 33*f* corresponding to the print job FF and the image 33*c* corresponding to the print job CC on the medium 30 is not printed.

More specifically, since the primary post-process is executed in the order of the region of the image 33*f* and the region of the image 33*b* in the medium 30, the control section 11 determines that it is necessary to change the setting of the primary post-process for the region of the image 33*b* in the medium 30. Since the secondary post-process is executed in the order of the region of the image 33*b* and the region of the image 33*f* in the medium 30, the control section 11 determines that it is necessary to change the setting of the secondary post-process for the region of the image 33*f* in the medium 30.

When the control section 11 determines that it is necessary to change the setting of the primary post-process with respect to the region of the image 33*b* in this way, in step S140 via step S1304, it causes the printing section 18 to print a "first change instruction" which is a setting change instruction of the first post-process at a position between the image 33*b* and the image 33*f* on the medium 30. In FIG. 11, the setting change instruction 37*b* for instructing the blade die replacement corresponds to the first change instruction. When the control section 11 determines that it is necessary to change the setting of the secondary post-process with respect to the region of the image 33*f* as described above, in step S140 via step S1304, it causes the printing section 18 to print a "secondary change instruction" which is a setting change instruction of the secondary post-process at the position between the image 33*b* and the image 33*f* on the medium 30. In FIG. 11, the setting change instruction 37*f* for instructing to change the number of slits corresponds to a second change instruction. The setting change instruction 37*b* and the setting change instruction 37*f* may be information representing only the setting to be changed or information representing both the setting to be changed and the setting not to be changed.

By outputting such a print result product 301, the user can proceed with the post-process as follows.

First, the user pulls out the medium 30 from the print result product 301 as a roll body, cuts the medium. 30 at the position of the cutting line CL1, and cut off the region where the roll information 38 is printed from the roll body. Then, the user confirms the primary post-process information 35*c*1 printed on the roll body, sets the roll body in the post-processing machine XXX for the primary post-process, performs necessary settings such as attaching the blade die aaa to the post-processing machine XXX, and causes the post-processing machine XXX to start the primary post-process.

The post-processing machine XXX executes label die punching for the region of the image 33*c* as the target, and subsequently executes label die punching for the region of the image 33f as the target. As can be seen from the above description, since there is no difference between the post-process setting information of the print job CC and the post-process setting information of the print job FF, printing for post-process including the setting change instruction is not performed between the image 33f and the image 33c. In this way, when there is no change in the setting of the post-process between the n-th print job and the (n+1)-th print job, it is possible to suppress consumption of the medium 30 or ink by omitting printing for the post-process. No margin is particularly secured between the image 33f and the image 33c. That is, even if it is described that the front margin is set in the specific setting information for the actual print of the print job CC, the setting is changed so as not to secure the front margin, and even if it is described that the rear margin is set in the specific setting information for the actual print of the print job FF, the setting is changed so as not to secure the rear margin, and the margin is not secured between the image 33f and the image 33c. This is performed together with the setting change for not printing the post-process information by the control section 11 in step S1305. Even after the post-processing machine XXX has finished label die punching for the region of the image 33f as the target, the medium 30 is continuously transported by the post-processing machine XXX. The user confirms the setting change instruction 37b and temporarily stops transport of the medium 30 by the post-processing machine XXX before the region of the image 33b becomes the target of label die punching by the post-processing machine XXX. Then, according to the setting change instruction 37b, the user replaces the current blade die aaa with the blade die bbb and causes transport of the medium 30 to resume by the post-processing machine XXX.

However, the temporarily stop of transport of the post-processing machine may be automatically performed. According to FIG. 11, the setting change instruction 37b includes a code image BC1 in addition to characters recognizable by the user. The code image BC1 is, for example, a bar code or a two dimensional code, and includes, as information, a temporarily stop instruction of the transport at the time of primary post-process. Therefore, if the post-processing machine XXX for the primary post-process has a camera capable of reading the code image and a code analysis function, the post-processing machine XXX can temporarily stop transport when the code image BC1 is read from the medium 30 being transported after label die punching for the region of the image 33f as the target is finished.

That is, in step S140, the control section 11 may cause the printing section 18 to print the setting change instruction and the stop instruction of the transport of the medium 30 at the position between the n-th image and the (n+1)-th image on the medium 30. In addition, at least one of the setting change instruction and the stop instruction of the transport of the medium 30 may be printed at the position between the n-th image and the (n+1)-th image on the medium 30. When only the setting change instruction is printed, the user confirms the setting change instruction and temporarily stops the transport of the medium 30 by the post-processing machine before the region of the n-th image or the (n+1)-th image becomes the target of the post-process by the post-processing machine. On the other hand, when only the stop instruction of the transport of the medium 30 is printed, the stop instruction means that the setting of the post-process is changed between the n-th image and the (n+1)-th image. Therefore, after the user or the post-processing machine stops the transport of the medium 30 based on the stop instruction of the transport of the medium 30, the user compares the information of the header corresponding to the (n+1)-th image with the information of the footer corresponding to the n-th image or confirms the information of the separated roll information 38, and changes the setting of the post-process.

The code image BC1 may include information other than the stop instruction of the transport, and may include the setting change instruction of the post-process as information. For example, the post-processing machine XXX temporarily stops the transport of the medium 30 by reading the code image BC1, and notifies and prompts the user to replace the blade die aaa with the blade die bbb in accordance with the setting change instruction. Alternatively, the post-processing machine XXX may temporarily stop transport of the medium 30 by reading the code image BC1 and automatically replace the blade die aaa with the blade die bbb in accordance with the setting change instruction.

That is, in step S140, the control section 11 can cause the printing section 18 to print the setting change instruction in the form of characters, the code image, or a combination of characters and the code image. After the blade die replacement, the post-processing machine XXX resumes the transport of the medium 30 in response to a user's instruction or automatically, and executes label die punching for the region of the image 33b as the target.

When label die punching for the region of the image 33b as the target by the post-processing machine XXX is completed, the user cuts the medium 30 at the position of the cutting line CL2 and cuts off the regions of the medium 30 corresponding to the print job BB, the print job FF, and the print job CC from the print result product 301 as a roll body. The region of the medium 30 corresponding to the print job BB, the print job FF, and the print job CC cut off in this way, that is, the region from the cutting line CL1 to the cutting line CL2 is wound into a roll shape by the winding device of the post-processing machine XXX to form a roll body (hereinafter referred to as a group job roll body).

Subsequently, the user confirms the primary post-process information 35a1 printed on the medium 30 fed out from the roll body set on the post-processing machine XXX, sets necessary settings such as the blade die according to the primary post-process information 35a1, and causes the post-processing machine XXX to start primary post-process for the region of the image 33a. If the code image is printed in the primary post-process information 35a1, when the code image is read from the medium 30 being transported by using the camera or the code analysis function capable of reading the code image provided in the post-processing machine XXX for the primary post-process, the post-processing machine XXX can automatically temporarily stop transport after label die punching for the region of the image 33a as the target is finished. Of course, if the primary post-process information 35a1 indicates the die-punching machine other than the post-processing machine XXX, the user sets the print result product 301 after the group job roll body is cut off to the die-punching machine indicated by the primary post-process information 35a1, and starts the primary post-process for the region of the image 33a as the target. When label die punching for the region of the image 33a as the target by any of the die-punching machine is completed, the user cuts the medium 30 at the position of the cutting line CL3 and cut off the region of the medium 30 corresponding to the print job AA from the print result product 301. The cut off region of the medium 30 corresponding to the print job AA, that is, the region from the cutting line CL2 to the cutting line CL3, is also wound into a roll shape to form a roll body (hereinafter referred to as a single job roll body).

The user confirms the secondary post-process information 35*b*2 printed on the group job roll body and sets the group job roll body in the post-processing machine YYY for the secondary post-process. At this time, the user performs necessary settings, such as setting the number of slits to 2, according to the secondary post-process information 35*b*2, and causes the post-processing machine YYY to start the secondary post-process. The post-processing machine YYY cuts the medium 30 for the region of the image 33*b* as the target. Subsequently, the medium 30 is transported by the post-processing machine YYY. The user confirms the setting change instruction 37*f* and temporarily stops the transport of the medium 30 by the post-processing machine YYY before the region of the image 33*f* becomes the target to be cut by the post-processing machine YYY. Then, according to the setting change instruction 37*f*, the user changes the number of slits from the current 2 to 4.

Similarly to the case where the code image BC1 is included in the setting change instruction 37*b*, the code image BC2 may be included in the setting change instruction 37*f*. The code image BC2 includes the temporarily stop instruction of the transport at the time of secondary post-process as information, or includes the setting change instruction of post-process as information. Since the method of using the code image BC2 is the same as the method of using the code image BC1, the description thereof will be omitted. After the number of slits is changed, the post-processing machine YYY restarts the transport of the medium 30 in response to the user's instruction or automatically, and cuts the medium 30 for the region of the image 33*f* as the target. Subsequently, the post-processing machine YYY performs cutting on the region of the image 33*c* as the target. Thus, the secondary post-process on the group job roll body is completed.

Of course, the user performs necessary settings to the post-processing machine necessary for the secondary post-process of the single job roll body in accordance with the secondary post-process information 35*a*2 printed on the single job roll body. Then, the post-processing machine in which the single job roll body is set is caused to execute the secondary post-process on the region of the image 33*a* corresponding to the print job AA.

Specific examples of the primary post-process and the secondary post-process that can be performed on the medium 30 after printing are not limited to those described above. The post-process on the medium 30 after the printing may be only the primary post-process. If the post-process is only the primary post-process, then the control section 11 does not need to cause the printing section 18 to execute printing for the secondary post-process.

3.2. Second Print Embodiment

The second print embodiment is different from the first print embodiment in the method of separating the collective print job group into the roll bodies. In the first print embodiment, the collective print job group is separated into one roll body, but in the second print embodiment, the manner of separating into the roll body differs according to the post-process performed on each of the adjacent print jobs in the two or more print jobs included in the collective print job group.

Figure 16:
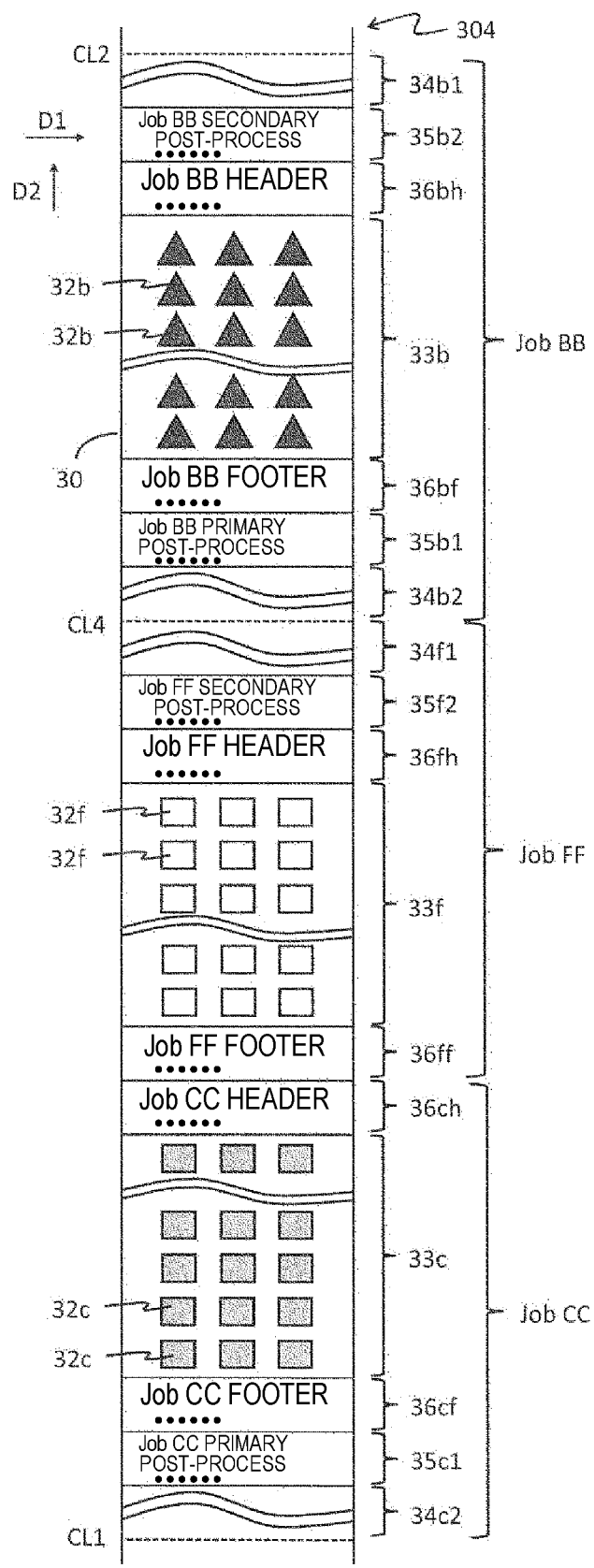
FIG. 16 is a diagram showing a print result product for describing a second print embodiment.

FIG. 16 is an extracted region corresponding to the range from the cutting line CL1 to the cutting line CL2 in the print result product 301 of FIG. 11 for describing the second print embodiment. The print result product in FIG. 16 is referred to as a print result product 304. The print result product 304 is the same as the print result product 301 in FIG. 11 except for the region shown in FIG. 16. The difference in FIG. 16 from FIG. 11 can be explained as primary post-process information 35*b*1, which is post-process setting information for the primary post-process of the print job BB, is printed between the footer 36*bf* of the print job BB and the rear margin 34*b*2 of the print job BB. Secondary post-process information 35*f*2, which is post-process setting information for secondary post-process of the print job FF, is printed between the front margin 34*f*1 of the print job FF and the header 36*fh* of the print job FF. Furthermore, a cutting line CL4 is set between the rear margin 34*b*2 of the print job BB and the front margin 34*f*1 of the print job FF.

The post-process comparison and determination process in the second print embodiment will be described with reference to the print result product 304 of FIG. 16. As described above, the print result product 304 printed in the second print embodiment is different from that in the first print embodiment in the method of separating the roll bodies related to the collective print job group. Specifically, when post-process settings performed for adjacent print jobs in the collective print job group are the same, the adjacent print jobs are wound on the same roll body, and when post-process settings are different, the print result product is cut at a position between the adjacent images of the adjacent print jobs, and the adjacent print jobs are separated into separate roll bodies. Therefore, similarly to the first print embodiment, the post-process comparison and determination process is performed on the print jobs included in the collective print job group.

Figure 17:
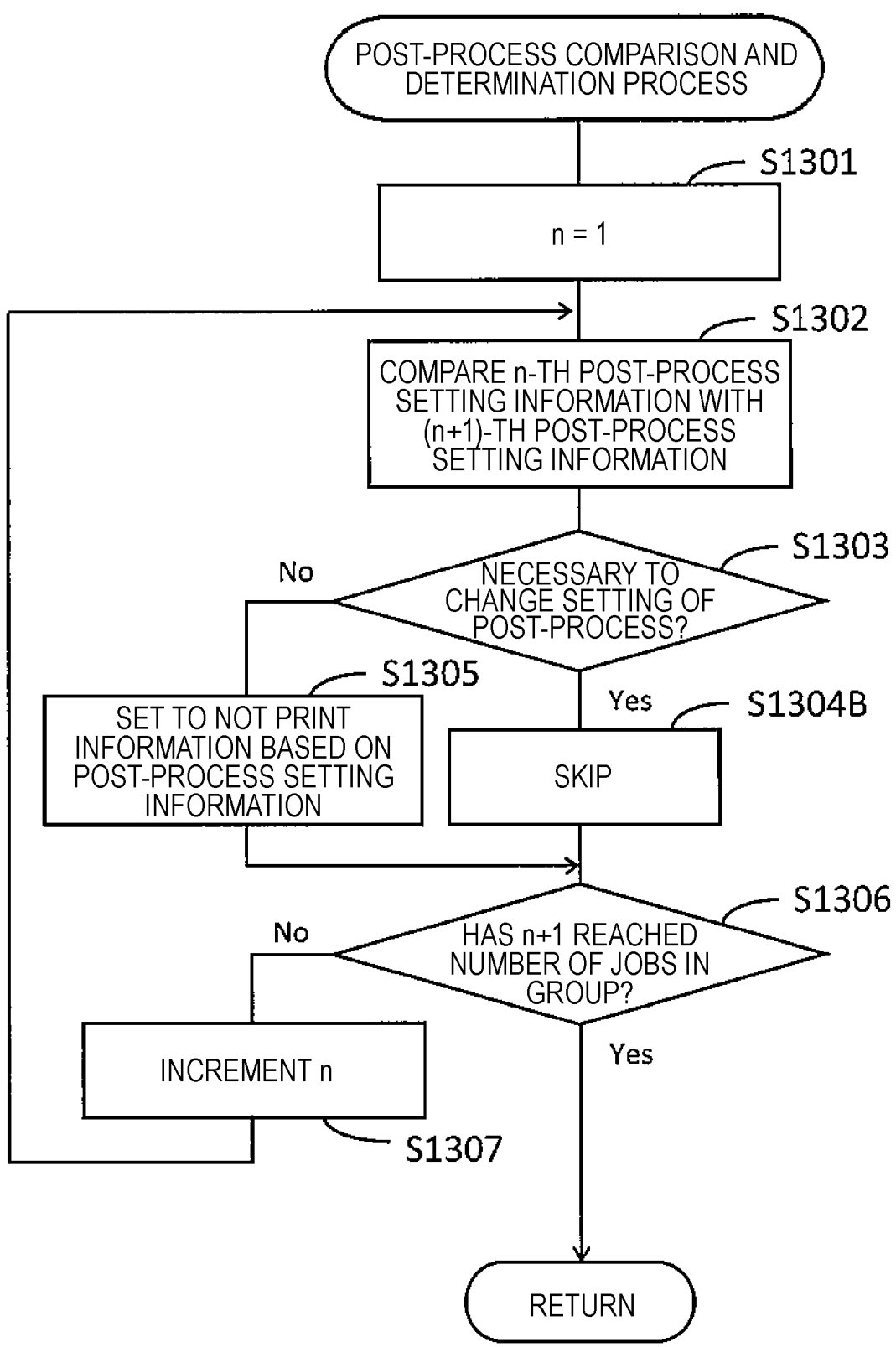
FIG. 17 is a flowchart showing post-process comparison and determination process according to the second print embodiment.

FIG. 17 is a flowchart showing the post-process comparison and determination process included in step S130. Regarding FIG. 17, the difference from the post-process comparison and determination process of the first print embodiment shown in FIG. 12 is described, and there is no step S1304. That is, in the first print embodiment, the print setting of the setting change instruction is performed in step S1304, whereas in the second print embodiment, after "Yes" in step S1303, the process proceeds to step S1306 without executing step S1304. Step S1304B in FIG. 17 indicates that step S1304 is not substantially executed, that is, S1304 is skipped. In the second print embodiment, by comparing the n-th post-process setting information and the (n+1)-th post-process setting information, it is determined whether or not it is necessary to change the post-process setting, and if it is determined that it is necessary to change the post-process setting, the printed result product is cut at the position between the n-th print job and the (n+1)-th print job and separated into the different roll bodies. Therefore, in a case where the separated roll body is set in the post-processing machine, the cutting position, that is, the position between the n-th print job and the (n+1)-th print job, will be at the lead end in the primary post-process or the secondary post-process. Therefore, it is more desirable to print the post-process setting information than to print the setting change instruction as in the first print embodiment. Since the post-process information such as the primary post-process information and the secondary post-process information is originally set to be printed at this position based on the specific setting information corresponding to the print job, the print setting is not changed so as to print the setting change instruction in step S1304.

Referring to the table 42, the post-process setting information differs between the print job BB and the print job FF.

Therefore, in the second print embodiment, the control section 11 has a setting for cutting the print result product at the position between the image 33b corresponding to the print job BB and the image 33f corresponding to the print job FF on the medium 30. Therefore, since the corresponding post-process information is printed at the position between the image 33b corresponding to the print job BB and the image 33f corresponding to the print job FF, the step S1304 is not performed and the print setting of the original post-process information is used as it is. On the other hand, according to the table 42, the post-process setting information is the same between the print job FF and the print job CC. Therefore, in the flowchart of FIG. 17, the control section 11 changes the print setting so that the post-process information is not printed at the position between the image 33f corresponding to the print job FF and the image 33c corresponding to the print job CC on the medium 30 (step S1305).

When the control section 11 determines that it is necessary to change the setting of the primary post-process with respect to the region of the image 33b in this way, in step S140, it causes the printing section 18 to print the primary post-process information 35b1, which is post-process setting information for the primary post-process, at the position between the image 33b and the image 33f on the medium 30. When the control section 11 determines that it is necessary to change the setting of the secondary post-process for the region of the image 33f as described above, then in step S140, it causes the printing section 18 to print the secondary post-process information 35f2, which is post-process setting information for the secondary post-process, at the position between the image 33b and the image 33f on the medium 30.

By outputting such the print result product 304, the user can proceed with the post-process as follows. First, the user pulls out the medium 30 from the print result product 304 as a roll body, cuts the medium 30 at the position of the cutting line CL1, and cut off the region where the roll information 38 is printed from the roll body. Then, the user confirms the primary post-process information 35c1 printed on the roll body, sets the roll body in the post-processing machine XXX for the primary post-process, performs necessary settings such as attaching the blade die aaa to the post-processing machine XXX, and causes the post-processing machine XXX to start the primary post-process.

The post-processing machine XXX executes label die punching for the region of the image 33c as the target, and subsequently executes label die punching for the region of the image 33f as the target. Although the medium 30 is continuously transported by the post-processing machine XXX even after the post-processing machine XXX finishes label die punching for the region of the image 33f as the target, the user confirms the primary post-process information 35b1 and temporarily stops transport of the medium 30 by the post-processing machine XXX before the region of the image 33b becomes the target of label die punching by the post-processing machine XXX. Then, the medium 30 is cut at the position of the cutting line CL4, and the regions of the medium 30 corresponding to the print job FF and the print job CC are cut off from the print result product 304 as a roll body. The regions of the medium 30 corresponding to the print job FF and the print job CC cut off in this way, that is, the region from the cutting line CL1 to the cutting line CL4 is wound into the roll shape by the winding device of the post-processing machine XXX to form the roll body (hereinafter referred to as a first roll body). In addition, the user confirms the secondary post-process information 35f2 printed on the first roll body and sets the first roll body in the post-processing machine YYY for the secondary post-process. At this time, the user performs necessary settings, such as setting the number of slits to 4, according to the secondary post-process information 35f2, and causes the post-processing machine YYY to start the secondary post-process. The post-processing machine YYY cuts the medium 30 for the regions of the image 33f and the image 33c as the target. Thus, the secondary post-process on the first roll body is completed.

On the other hand, in the post-processing machine XXX, the user confirms the primary post-process information 35b1 of the print job BB, replaces the current blade die aaa with the blade die bbb, and causes resume the transport of the medium 30 by the post-processing machine XXX. However, the temporarily stop of transport of the post-processing machine may be automatically performed. When the post-processing machine XXX for the primary post-process has the camera capable of reading the code image and the code analysis function, and the primary post-process information 35b1 of the print job BB includes the code image in addition to the character that can be recognized by the user, the post-processing machine XXX can temporarily stop transport when the code image is read from the medium 30 being transported after label die punching for the region of the image 33f as the target is finished. When the code image as the primary post-process information 35b1 is not to be printed, the control section 11 may set the print setting to the primary post-process information 35b1 to print the code image for temporarily stopping transport of the medium 30 in step 31304B. The printing position of the code image for temporarily stopping the transport of the medium 30 is not limited to the position of the primary post-process information 35b1 as long as it is a position at which transport of the medium 30 by the post-processing machine XXX can be temporarily stopped before the region of the image 33b of the print job BB becomes the target of label die punching by the post-processing machine XXX. More desirably, the printing position of the code image for temporarily stopping transport of the medium 30 is a position at which the transport of the medium 30 by the post-processing machine XXX can be temporarily stopped before the region of the header 36fh of the print job FF becomes the target of label die punching by the post-processing machine XXX.

Further, in step 31304B, among the (n+1)-th post-process setting information corresponding to the (n+1)-th print job, print setting for changing character color, changing character font, or changing character size may be performed for information different between the n-th print job and the (n+1)-th print job. In this way, when the medium 30 is cut between the n-th image of the n-th print job and the (n+1)-th image of the (n+1)-th print job, and the post-process setting for the (n+1)-th image of the (n+1)-th print job remaining on the roll body is set for the corresponding post-processing machine, it is possible to easily read which setting should be changed from the post-process information printed on the medium 30.

When label die punching for the region of the image 33b as the target by the post-processing machine XXX is completed, the user cuts the medium 30 at the position of the cutting line CL2 and cuts off the region of the medium 30 corresponding to the print job BB from the print result product 304 as a roll body. The region of the medium 30 corresponding to the print job BB cut off in this way, that is, the region from the cutting line CL4 to the cutting line CL2, is wound in the roll shape by the winding device of the post-processing machine XXX to form the roll body (hereinafter, referred to as a second roll body). The second roll body is set in the post-processing machine YYY after the secondary post-process information 35b2 printed on the second roll body is confirmed and the secondary post-process on the first roll body is completed. Similarly to the case where the code image is included in the primary post-process information 35b1, the code image may be included in the secondary post-process information 35b2, 35f2. The code image includes the temporarily stop instruction for transport at the time of secondary post-process as information, or includes the setting change instruction of post-process as information.

Subsequently, the user confirms the primary post-process information 35a1 printed on the medium. 30 fed out from the roll body set on the post-processing machine XXX, sets necessary settings such as the blade die according to the primary post-process information 35a1, and causes the post-processing machine XXX to start primary post-process for the region of the image 33a. Further, if the code image is printed in the primary post-process information 35a1, the post-processing machine XXX can use a camera or code analysis function capable of reading the code image included in the post-processing machine XXX for primary post-process to automatically temporarily stop transport when the code image is read from the medium 30 being transported after label die punching for the region of the image 33b as the target is finished. Of course, if the primary post-process information 35a1 instructs the die-punching machine other than the post-processing machine XXX, the user sets the print result product 304 after the first roll body and the second roll body are cut off in the die-punching machine indicated by the primary post-process information 35a1 to start the primary post-process for the region of the image 33a as the target. When label die punching for the region of the image 33a as the target by any of the die-punching machines is completed, the user cuts the medium 30 at the position of the cutting line CL3 and cuts off the region of the medium 30 corresponding to the print job AA from the print result product 304. The cut off region of the medium 30 corresponding to the print job AA, that is, the region from the cutting line CL2 to the cutting line CL3, is also wound into the roll shape to form a roll body (hereinafter referred to as a third roll body). The user performs necessary setting on the post-processing machine necessary for the secondary post-process of the third roll body in accordance with the secondary post-process information 35a2 printed on the third roll body. Then, the post-processing machine in which the third roll body is set is caused to execute the secondary post-process on the region of the image 33a corresponding to the print job AA.

3.3. Third Print Embodiment

The third print embodiment is different from the first print embodiment and the second print embodiment in that the separation form into roll bodies varies depends on the post-process performed on each of the adjacent print jobs, regardless of whether or not a collective print job group is set.

Figure 18:
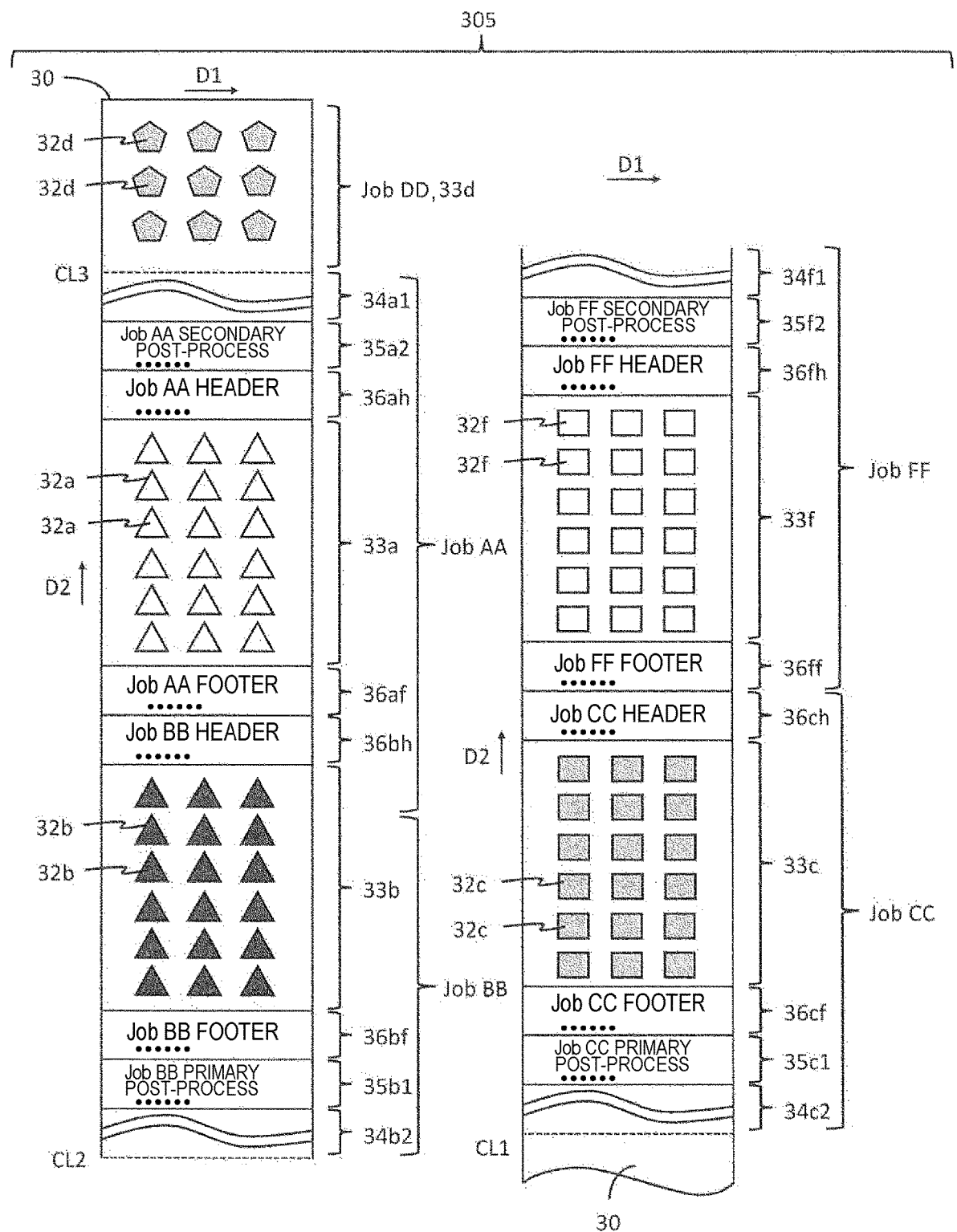
FIG. 18 is a view showing a print result product for describing the third print embodiment.

FIG. 18 shows a print result product 305 for describing the third print embodiment. Regarding the print result product 305, the differences from the print result product 301 in FIG. 11 will be described, the shape of the object 32a constituting the image 33a corresponding to the print job AA is the same as the shape of the object 32b constituting the image 33b corresponding to the print job BB. In addition, the primary post-process information 35a1 of the print job AA, the rear margin 34a2 of the print job AA, the front margin 34b1 of the print job BB, and the secondary post-process information 35b2 of the print job BB, which are disposed between the footer 36af of the print job AA and the header 36bh of the print job BB, are not disposed there. Although in the print result product 301, the setting change instruction 37b is printed on the downstream side of the rear margin 34b2 of the print job BB, in the print result product 305, the primary post-process information 35b1 of the print job BB is printed. Further, in the print result product 301, the setting change instruction 37f is printed on the downstream side of the header 36fh of the print job FF, on the other hand, in the print result product 305, the secondary post-process information 35f2 of the print job FF is printed. The cutting line CL2 set in the print result product 301 in between the rear margin 34a2 of the print job AA and the front margin 34b1 of the print job BB is set between the rear margin 34b2 of the print job BB and the front margin 34f1 of the print job FF in the print result product 305. The cutting line CL2 of the print result product 305 is the same as the cutting line CL4 of the print result product 304 of FIG. 16.

The post-process comparison and determination process in the third print embodiment will be described with reference to the print result product 305 of FIG. 18. As described above, the print result product 305 printed in the third print embodiment is different from the first print embodiment and the second print embodiment in that the separation form into the roll bodies varies depending on the post-process performed on each of the adjacent print jobs regardless of whether or not the collective print job group is set. Specifically, regardless of whether or not the print jobs belong to the same collective print job group, when the settings for post-process set for the adjacent print jobs are the same, then the adjacent print jobs are wound on the same roll body, and when settings for post-process are different, then the print result product is cut at a position between adjacent images of adjacent print jobs and the adjacent print jobs are separated into separate roll bodies. Therefore, unlike the first print embodiment and the second print embodiment, the post-process comparison and determination process is performed on all the adjacent print jobs. The flowchart of the post-process comparison and determination process in the third print embodiment is the same as that of the second print embodiment shown in FIG. 17. However, the target for which the post-processing comparison and determination process is performed is different from that of the second print embodiment. In addition, in the third print embodiment, the determination of step S1306 is replaced with a determination of "Has n+1 reached number of print jobs for which second print mode (actual print) has been designated?"

In FIG. 13C, the post-process setting information of each print job for which the actual print is designated in the third print embodiment are shown by table 44 for easy comparison. Referring to the table 44, post-process setting information is different between the print job BB and the print job FF. Therefore, in the third print embodiment, the control section 11 has a setting for cutting the print result product at the position on the medium 30 between the image 33b corresponding to the print job BB and the image 33f corresponding to the print job FF. Therefore, since the corresponding post-process information is printed at a position between the image 33b corresponding to the print job BB and the image 33f corresponding to the print job FF, nothing is performed in step S1304B of FIG. 17, and the post-process information originally set to be printed is used as it is. On the other hand, according to the table 44, the post-process setting information is the same between the print job FF and the print job CC. Therefore, in the flowchart of FIG. 17, the control section 11 changes the print setting so that the post-process information is not printed at the position between the image 33f corresponding to the print job FF and the image 33c corresponding to the print job CC on the medium 30 (step S1305). Similarly, the post-process setting information is the same between the print job BB and the print job AA. Therefore, in the flowchart of FIG. 17, the control section 11 changes the print setting so that the post-process information is not printed at a position between the image 33b corresponding to the print job BB and the image 33a corresponding to the print job AA on the medium 30 (step S1305).

By outputting such a print result product, the user can proceed with the post-process as follows. Here, only differences from the second print embodiment will be described. The user confirms the primary post-process information 35b1 of the print job BB, replaces the current blade die aaa with the blade die bbb, and causes transport of the medium 30 by the post-processing machine XXX to resume. Then, the post-processing machine XXX executes label die punching for the region of the image 33b as the target, and subsequently executes label die punching for the region of the image 33a as the target.

When label die punching for the region of the image 33a as the target by the post-processing machine XXX is completed, the user cuts the medium 30 at the position of the cutting line CL3, and cuts off the region of the medium 30 corresponding to the print job AA and the print job BB from the print result product 305. The cut off region of the medium 30 corresponding to the print job AA and the print job BB, that is, the region from the cutting line CL2 to the cutting line CL3, is also wound into a roll shape to form a roll body (hereinafter referred to as a fourth roll body).

As described above, in the third print embodiment, the print job AA and the print job BB are not included in the same collective print job group, but the print job AA and the print job BB have the same post-process setting information related to the primary post-process, so that the print job AA and the print job BB are wound on the same roll body (fourth roll body). Next, the user performs necessary settings on the post-processing machine necessary for the secondary post-process of the fourth roll body in accordance with the secondary post-process information 35a2 printed on the fourth roll body. Then, the post-processing machine in which the fourth roll body is set is caused to execute the secondary post-process on the region of the image 33a corresponding to the print job AA, and subsequently, the secondary post-process is executed on the region of the image 33b.

As described above, the first print embodiment, the second print embodiment, and the third print embodiment differ in what position (unit) and/or at what timing the print result product is cut, but cutting information, which is information defining the cutting unit and timing, is set in the printing device 10 in advance. Alternatively, the cutting information may be arbitrarily set by the user as the print setting information. Cutting information is also referred to as cutting mode. For example, as the cutting mode, a first cutting mode corresponding to the first print embodiment, a second cutting mode corresponding to the second print embodiment, and a third cutting mode corresponding to the third print embodiment can be set as the print setting information, and in step S120, the setting information acquisition section 12c acquires the cutting mode to be set for the print job registered in the print waiting list 55 as the print setting information. Then, in step S130, the control section 11 determines, based on the cutting mode acquired as a part of the print setting information, the print job to be the target of the post-process comparison and determination process and the print processing to be performed when the setting change of the post-process is necessary. In this way, print setting may be enabled with the cutting mode as the print setting information.

That is, the control section 11 executes the first print embodiment when the first cutting mode is designated as the cutting information, executes the second print embodiment when the second cutting mode is designated as the cutting information, and executes the third print embodiment when the third cutting mode is designated as the cutting information. As can be seen from the above description, when the first cutting mode or the second cutting mode is designated, the control section 11 compares the post-process setting information between the print jobs that belong to the same collective print job group and that are adjacent to each other in the printing order, and proceeds to step S1304 (or step S1304B) or step S1305. In addition, when the third cutting mode is designated, then if the actual print is designated in the print job, then the control section 11 compares the post-processing setting information of the print jobs that are adjacent to each other in the printing order, regardless of whether or not the print jobs belong to the collective print job group, and proceeds to either step S1304B or step S1305.

The first cutting mode and the second cutting mode are also collectively referred to as first cutting information, and the third cutting mode is also referred to as second cutting information. That is, the control section 11, when the cutting information is the first cutting information, in comparing the n-th post-processing setting information and the (n+1)-th post-processing setting information, the relationship between the n-th print job and the (n+1)-th print job belonging to the collective print job group is targeted. On the other hand, when the cutting information is the second cutting information, in comparing the n-th post-processing setting information and the (n+1)-th post-processing setting information, all of the specified print jobs linked to the post-processing setting information are targeted.

Several modification examples included in the present embodiment will be described below. Needless to say, combinations of the above-described embodiments, combinations of the embodiments and the modification examples, and combinations of the modification examples are included in the disclosure of the present specification.

4. First Modification Example

As described above, post-process setting information is included in the specific setting information acquired for the print job for which the second print mode is designated. Such post-process setting information may include "format information" for designating a print format of the setting change instruction. The format information is information for designating various formats such as a font, a character size, a color, a thickness, an underline, and decoration such as hatching, and can be generated by the user in advance. Then, when causing the printing section 18 to execute printing of a collective print job group in step S140, the control section 11 causes the printing section 18 to print the setting change instruction in the print format specified by the format information.

As a result, referring to the example of FIG. 11, the characters in the setting change instruction 37b and the characters in the setting change instruction 37f are printed in the print format specified by the format information. Thus, a blade die replacement instruction in the setting change instruction 37b and the characters in the change instruction for the number of slits in the setting change instruction 37f are conspicuous due to the difference in font, size, color, and the like from the characters and the like in the other regions of the medium 30, and the user can more easily recognize the setting change instruction.

Further, the control section 11 may change the printing format of the setting change instruction within the range specified by the format information according to the comparison result between the n-th post-process setting information and the (n+1)-th post-process setting information, and cause the printing section 18 to print the setting change instruction. In this case, the format information specifies a plurality of print formats in advance.

A specific example will be described. For example, when the post-process setting information of the print job BB and the print job FF forming the group G1 is compared, as shown in FIG. 13A, the post-processing machine used for the primary post-process may be the same but the blade die may be different, or the post-processing machine used for the primary post-process and the blade die may also be different. When comparing the post-process setting information of the print job BB and the print job FF, the post-processing machine used for the secondary post-process may be the same but the number of slits different as is shown in FIG. 13A, or both the post-processing machine used for the secondary post-process and the number of slits may be different.

Therefore, for example, the control section 11 makes the print format of the setting change instruction different between a case where the post-processing machine used for the primary post-process is the same and the blade die is different between the print jobs and a case where the post-processing machine used for the primary post-process and the blade die are different between the print jobs. In this case, when the post-processing machine used for the primary post-process is the same and the blade die is different between the print jobs, the blade die replacement instruction as the setting change instruction is printed in, for example, a first font, a first character size, a first color, or the like, and when the post-processing machine and the blade die used for the primary post-process are different between the print jobs, the post-processing machine and the blade die replacement instruction as the setting change instruction is printed in a second font, a second character size, a second color, or the like. When the post-processing machine used for the primary post-process and the blade die are different between the print jobs, the control section 11 may print the post-processing machine change instruction as the setting change instruction and the blade die change instruction indifferent fonts, character sizes, colors, or the like. Similarly, with respect to the setting change instruction relating to the secondary post-process, the print format can be changed depending on the comparison result of the post-process setting information between the print jobs.

5. Second Modification Example

The second modification example will be described with reference to FIGS. 13B and 14.

In FIG. 13B, the post-process setting information of each of the print job FF, the print job CC, the print job BB, and the print job AA, which form a certain collective print job group, are shown by table 43 for easy comparison. The way of viewing the table 43 is the same as the way of viewing the table 42. According to the table 43, for both of the print job FF and the print job CC, the post-processing machine XXX is used for label die punching in the primary post-process, and the blade die aaa is used. Further, for both the print job BB and the print job AA, the post-processing machine ZZZ is used for label die punching, but the blade die bbb is used for the print job BB and the blade die ccc is used for the print job AA. For any of the print job FF, the print job CC, the print job BB, and the print job AA, the post-processing machine YYY is used to cut the medium 30 for the secondary post-process, and the medium 30 is cut with the number of slits=2 for the print job FF, and the medium 30 is cut with the number of slits=4 for the print job CC, the print job BB, and the print job AA.

In the second modification example, it is assumed that the control section 11 causes the printing section 18 to perform the actual print on the medium 30 of the collective print job group including the print job FF, the print job CC, the print job BB, and the print job AA in this order of print jobs and according to the post-process setting information of the table 43. FIG. 14 shows the medium 30 on which the collective print job group according to the second modification example is printed as a print result product 302. The way of viewing FIG. 14 is basically the same as the way of viewing the print result product 301 of FIG. 11, but is more simplified than the print result product 301.

Figure 14:
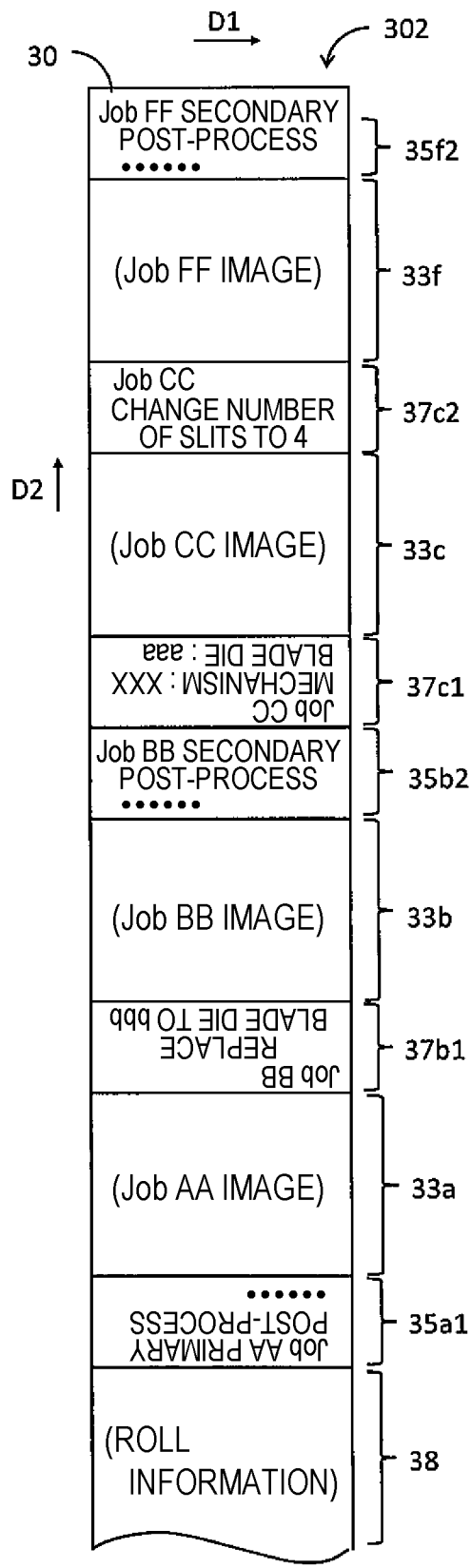
FIG. 14 is a diagram showing a print result product according to a second modification example.

In FIG. 14, the front margin, the rear margin, the header, and the footer in the medium 30 are omitted. With respect to the image 33f, the image 33c, the image 33b, and the image 33a, which are images printed in a plurality of copies based on the image data of each of the print job FF, the print job CC, the print job BB, and the print job AA, the description shown in FIG. 11 for individual objects which is omitted.

According to the print result product 302, the secondary post-process information 35f2, which is post-process setting information for the secondary post-process of the print job FF, is printed on the most downstream side. The image 33f corresponding to the print job FF, a setting change instruction 37c2 for the secondary post-process of the print job CC, the image 33c corresponding to the print job CC, a setting change instruction 37c1 for the primary post-process of the print job CC, and the secondary post-process information 35b2, which is the post-process setting information for the secondary post-process of the print job BB, are printed in this order from the secondary post-process information 35f2 toward the upstream side. Further, in order toward the upstream side, the image 33b corresponding to the print job BB, a setting change instruction 37b1 for the primary post-process of the print job BB, the image 33a corresponding to the print job AA, the primary post-process information 35a1, which is the post-process setting information for the primary post-process of the print job AA, and the roll information 38 are printed. The region of the print result product 302 in which the roll information 38 is printed is cut from the print result product 302 before the start of the primary post-process.

According to the print result product 302, the characters of the primary post-process information 35a1, the setting change instruction 37b1, and the setting change instruction 37c1, which are printed for the primary post-process, are printed oriented with the upstream side upward and the downstream side downward. On the other hand, characters of the secondary post-process information 35f2, the setting change instruction 37c2, and the secondary post-process information 35b2, which are printed for the secondary post-process, are printed oriented with the downstream side upward and the upstream side downward. According to such printing, the primary post-process information 35a1, the setting change instruction 37b1, and the setting change instruction 37c1 can be easily read by the user at the time of the primary post-process executed with the upstream side of the medium 30 directed to the leading side of the transport, and the user can accurately recognize the information necessary for the primary post-process. Further, the secondary post-process information 35f2, the setting change instruction 37c2, and the secondary post-process information 35b2 are oriented so as to be easily read by the user at the time of the secondary post-process executed with the downstream side of the medium 30 directed to the leading side of the transport.

As can be seen from the above description, the setting change instruction 37b1 and the setting change instruction 37c1 each correspond to an example of the first change instruction, and the setting change instruction 37c2 corresponds to an example of the second change instruction. That is, according to the second modification example, when characters are included in the first change instruction and the second change instruction, the control section 11 causes the printing section 18 to print the characters of the first change instruction and the characters of the second change instruction in different directions. When the direction of the characters of the first change instruction and the direction of the characters of the second change instruction are set to different directions, the directions may be opposite to each other in the width direction D1 instead of being opposite to each other in the transport direction D2 as in FIG. 14. In addition, the directions of the characters of the first change instruction and the directions of the characters of the second change instruction may be not only opposite to each other but also different from each other by, for example, 90 degrees.

Focusing on the first change instruction in FIG. 14, since there is no difference in the post-process setting information of the primary post-process between the print job CC and the print job FF, no first change instruction is printed between the image 33c and the image 33f. Further, focusing on the second change instruction in FIG. 14, since there is no difference in the post-process setting information of the secondary post-process between the print job BB and the print job AA, no second change instruction not printed between the image 33b and the image 33a.

In addition, as shown in FIG. 13B, the post-process setting information is common for the secondary post-process related to the print job CC, the print job BB, and the print job AA, which are printed in succession. Therefore, in the print result product 302, if the setting change instruction 37c2 exists on the downstream side of the image 33c, the secondary post-process information 35b2 printed on the downstream side of the image 33b should essentially be unnecessary. However, in the second modification example, the post-processing machine of the primary post-process is changed from the post-processing machine ZZZ to the post-processing machine XXX between the primary post-process for the region of the image 33b and the primary post-process for the region of the image 33c. Therefore, at the timing when the primary post-process of the region of the image 33b by the post-processing machine ZZZ is completed, the portion of the medium 30 including the region of the image 33a and the region of the image 33b is cut from the roll body and provided for the secondary post-process. The roll body remaining after cutting off the portion of the medium 30 including the region of the image 33a and the region of the image 33b is naturally set in the XXX of the post-processing machine for the primary post-process.

After separation from the roll body, if there is no printing for secondary post-process at the downstream end of the portion of the medium 30 including the region of the image 33a and the region of the image 33b, the setting of the number of slits and the like in the secondary post-process by the post-processing machine YYY for the portion will be unclear. In view of such circumstances, the control section 11 controls the printing of the collective print job group such that the secondary post-process information 35b2 necessary for the secondary post-process for the portion of the medium 30 cut from the roll body in the process of the primary post-process is printed.

6. Third Modification Example

The medium 30 after printing by the printing section 18 may be subjected to a "tertiary post-process" as post-process subsequent to the secondary post-process. Similarly to the primary post-process, the tertiary post-process is executed in the order of the region of the (n+1)-th image and the region of the n-th image in the medium 30. When it is assumed that the tertiary post-process is executed, the post-process setting information associated with the print job includes information related to each of the primary post-process, the secondary post-process, and the tertiary post-process.

Therefore, the control section 11 compares the n-th post-process setting information with the (n+1)-th post-process setting information, and when it is determined that it is necessary to change the setting of the tertiary post-process for the region of the n-th image on the medium 30, then the control section 11 may cause the printing section 18 to print a "third change instruction", which is a change instruction of the setting of the tertiary post-process, at a position between the first change instruction and the n-th image on the medium 30.

Figure 15:
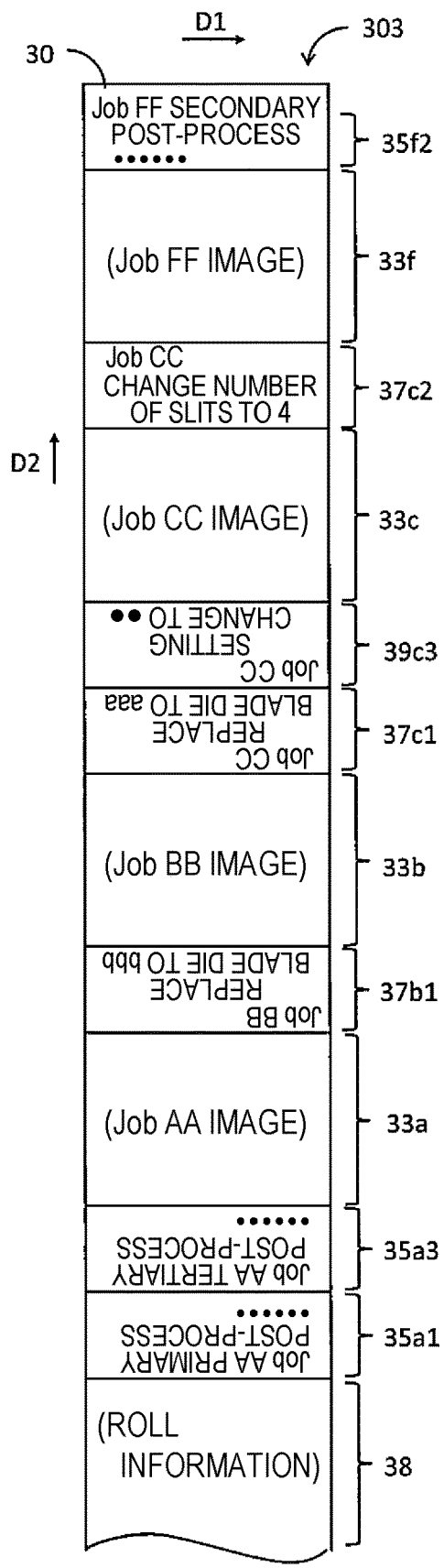
FIG. 15 is a diagram showing a print result product according to a third modification example.

FIG. 15 shows the medium 30 on which the collective print job group according to the third modification example is printed as a print result product 303. About FIG. 15, mainly the difference with FIG. 14 is described. In the third modification example also, it is assumed that the collective print job group including the print job FF, the print job CC, the print job BB, and the print job AA is actually printed on the medium 30 by the printing section 18 in this order of print jobs, substantially according to the post-process setting information of the table 43. However, in order to simplify description, it will be assumed that the primary post-process is executed by the post-processing machine ZZZ for all of the print jobs.

Therefore, the secondary post-process information 35b2 included in the print result product 302 of FIG. 14 is not necessary in the third modification example, and is not included in the print result product 303. Further, the setting change instruction 37c1 included in the print result product 302 is content instructing a change of not only the blade die but also the mechanism, that is, the post-processing machine, but it is sufficient that the setting change instruction 37c1 included in the print result product 303 include only content instructing replacement of the blade die.

In the third modification example, according to the post-process setting information associated with the print job, it is assumed that the tertiary post-process to be executed on the regions of the images 33a, 33b, 33c, and 33f of the print job AA, the print job BB, the print job CC, and the print job FF is a process of changing some settings after the tertiary post-process on the region of the image 33b and before the tertiary post-process on the region of the image 33c. It does not matter what kind of post-process the tertiary post-process is. The tertiary post-process is, for example, various processing such as processing using heat or processing for making a hole in the medium 30, but in any case, in the third modification example, it is necessary to change the setting of a part of the tertiary post-process after the tertiary post-process to the region of the image 33b and before the tertiary post-process to the region of the image 33c. Therefore, when the image 33b corresponding to the print job BB is regarded as the (n+1)-th image and the image 33c corresponding to the print job CC is regarded as the n-th image, the control section 11 determines that it is necessary to change the setting of the tertiary post-process for the region of the n-th image. Based on this determination, the control section 11 prints a setting change instruction 39c3 as the third change instruction at a position between the setting change instruction 37c1 as the first change instruction for the region of the image 33c and the image 33c.

As described above, by including the setting change instruction 39c3 in the print result product 303, when the roll body of the print result product 303 is set in the post-processing machine of the tertiary post-process and the tertiary post-process is started after the secondary post-process for the print result product 303 is completed, the user can change the setting of the tertiary post-process at an appropriate timing according to the setting change instruction 39c3. Incidentally, a tertiary post-process information 35a3 in the print result product 303 is printed between the primary post-process information 35a1 for the image 33a of the print job AA and the image 33a, and represents the post-process setting information necessary for the tertiary post-process to the region of the image 33a. That is, the tertiary post-process information 35a3 and the setting change instruction 39c3 are printing for the tertiary post-process. Further, according to the print result product 303, printing of characters for the tertiary post-process is printing in an orientation with the upstream side upward and the downstream side downward, similarly to the primary post-process information 35a1, the setting change instruction 37b1, and the setting change instruction 37c1, which are printing for the primary post-process.

In FIGS. 14 and 15, the front margin and the rear margin as shown in FIG. 11 are not shown, but in practice, the front margin and the rear margin are secured on the medium 30 in accordance with the setting of the margin amount of each print job to be the target of the actual print. In the above description, the setting change instructions 37b, 37f, 37c2, 37c1, 37b1, and 39c3 are assumed to be printed in a region secured separately from the front margin and the rear margin of the medium 30, but these setting change instructions may be printed in the front margin and the rear margin. In addition, the primary post-process information, the secondary post-process information, and the tertiary post-process information may be printed in the front margin or the rear margin. This makes it possible to further suppress the consumption of the medium 30 in the actual print.

7. Summary

According to the present embodiment the printing device 10 includes the printing section 18 for printing the print job on the medium 30, the control section 11 that is configured to receive designation of the first print mode or the second print mode for one or more print jobs and that is configured to perform print setting, in accordance with print setting information, for print jobs for which the first print mode or the second print mode is designated and cause the printing section 18 to execute printing in accordance with the print setting, and the storage section 15.

The consumption amount of the medium 30 in the printing of one print job in the second print mode is larger than the consumption amount of the medium 30 in the printing of one print job in the first print mode.

The control section 11 configured to acquire, of the print setting information for the print job for which the first print mode is designated, specific setting information that causes the difference in the consumption amount between printing in the first print mode and printing in the second print mode, from one of initial setting information of printing stored in advance in the storage section 15, incidental setting information accompanying the print job for which the first print mode is designated, or the first setting information file that is saved in the predetermined folder and that is the file different from both the initial setting information and the incidental setting information, and is configured to perform print setting of the print job for which the first print mode is designated according to the acquired specific setting information.

When the control section acquires the specific setting information for the print job for which the first print mode is designated from the initial setting information, the control section 11 acquires the specific setting information among the print setting information for the print job for which the second print mode is designated from either incidental setting information attached to the print job for which the second print mode is designated or the second setting information file which is stored in a predetermined folder and is a file different from any of the initial setting information, the incidental setting information, and the first setting information file, when the control section acquires the specific setting information for the print job for which the first print mode is designated from the incidental setting information, the control section acquires the specific setting information for the print job for which the second print mode is designated from the second setting information file, and when the control section acquires the specific setting information for the print job for which the first print mode is designated from the first setting information file, the control section acquires the specific setting information for the print job for which the second print mode is designated is acquired from either the incidental setting information accompanying the print job for which the second print mode is designated or the second setting information file, and the control section performs print setting of the print job for which the second print mode is designated is performed according to the acquired specific setting information for the print job for which the second print mode is designated.

According to the configuration, the printing device 10 can easily acquire the specific setting information necessary for the print setting of the print job in which the first print mode is designated and the specific setting information necessary for the print setting of the print job in which the second print mode is designated from different acquisition sources. Therefore, when the first print mode or the second print mode is arbitrarily designated for the print job, the user is released from the burden and the inconvenience of setting the specific setting information required for each mode by himself/herself, and it is possible to automatically obtain an accurate print setting.

According to the present embodiment, wherein the specific setting information includes information on the number of print copies.

The specific setting information includes information on the margin amount to be secured in the medium 30.

The specific setting information includes information indicating presence or absence of printing for a post-process to be performed on the medium 30 after printing of the print job by the printing section 18.

The specific setting information includes information indicating presence or absence of printing of a header of the print job, a footer of the print job, or both a header and a footer of the print job According to this configuration, the printing device 10 can accurately acquire the settings that are different between the first print mode and the second print mode, such as the number of print copies to be printed, the margin amount, whether or not to print for post-process, and whether or not to print the header and/or footer of the print job, while reducing the burden on the user.

According to the present embodiment, the printing device 10 may further include the display section 13 configured to display the list of print jobs, wherein the control section 11 is configured to receive, as designation of the first print mode, a state in which no selection is made in the selection section 56 displayed corresponding to each of the print jobs in the list, and is configured to receive, as designation of the second print mode, a state in which selection is made in the selection section 56.

According to the configuration, the user can easily and accurately designate the first print mode or the second print mode for the print job.

According to the present embodiment, the printing device 10 may further include the display section 13 configured to display the list of print jobs, wherein the control section 11 is configured to receive, as the designation of the first print mode, a state not included in the selection range input by the user in the list, and is configured to receive, as the designation of the second print mode, a state included in the selection range.

According to the configuration, the user can easily and accurately designate the first print mode or the second print mode for the print job.

According to the present embodiment, the printing device 10 may further include the collective receive button for collectively receiving designation of the second print mode for the plurality of print jobs, wherein the control section 11 is configured to, when the collective receive button is operated, collectively receive the designation of the second print mode for the plurality of print jobs described in the second setting information file, and is configured to acquire the specific setting information for the plurality of print jobs for which the second print mode is designated from the second setting information file.

According to the configuration, the user can collectively designate the second print mode for the plurality of print jobs described in the second setting information file by operating the collective receive button.

According to the present embodiment, the printing device 10 includes the printing section 18 that prints the image on the medium based on the image data, the storage section 15 that stores the print job having the image data, and the control section 11 that performs print setting for the printing section 18 based on the print setting information including the post-process setting information indicating setting of the post-process to be executed on the medium 30 on which the image is printed and causes the printing section 18 to print two or more print jobs designated among the plurality of print jobs stored in the storage section 15. When n is an integer equal to or greater than 1, and when the image to be the print target on the medium 30 based on the image data of the n-th print job which is the n-th print target by the printing section 18 among the two or more print jobs is the n-th image, the image to be the print target on the medium 30 based on the image data of the (n+1)-th print job which is the (n+1)-th print target by the printing section 18 among the two or more print jobs is the (n+1)-th image, the post-process setting information associated with the n-th print job is n-th post-process setting information, and the post-process setting information associated with the (n+1)-th print job is (n+1)-th post-process setting information, the control section 11 compares the n-th post-process setting information with the (n+1)-th post-process setting information to determine whether or not it is necessary to change the post-process setting, and when it is not necessary to change the post-process setting, the control section 11 changes the print setting so as not to print information based on the post-process setting information which has been set as the print setting for the printing section 18 to print at the position between the n-th image and the (n+1)-th image on the medium 30.

According to the configuration, when there is no change in the setting of the post-process between the n-th print job and the (n+1)-th print job to be continuously printed, the printing device 10 does not print the information based on the post-process setting information set to be printed at the position between the n-th image and the (n+1)-th image on the medium 30. Accordingly, when there is no change in the setting of the post-process between the n-th print job and the (n+1)-th print job, it is possible to avoid printing related to the setting of the post-process at a position between the n-th image and the (n+1)-th image. That is, it is possible to perform printing necessary for post-process while suppressing waste of the medium 30 or ink.

Further, according to the present embodiment, such a configuration may be such that the print setting information include the information of the margin amount in the medium 30, and the control section 11 changes the print setting so as not to secure the margin set to be secured between the n-th image and the (n+1)-th image in the medium 30 by the information of the margin amount when it is not necessary to change the setting of the post-process.

According to the configuration, when there is no change in the setting of the post-process between the n-th print job and the (n+1)-th print job, the control section 11 does not secure the margin which is set to be secured between the n-th image and the (n+1)-th image on the medium 30. Thus, the consumption amount of the medium 30 can be suppressed.

In addition, according to the present embodiment, when it is necessary to change the setting of the post-process, the control section 11 causes the printing section 18 to print at least one of the change instruction of the setting of the post-process and the stop instruction of the transport of the medium 30 at the position between the n-th image and the (n+1)-th image on the medium 30.

According to the configuration, when there is a change in the setting of the post-process between the n-th print job and the (n+1)-th print job, the control section 11 prints the instruction for the change or the stop instruction of the transport between the n-th image and the (n+1)-th image on the medium 30, thereby improving workability and convenience in the post-process. Further, since it is not necessary for the user to determine the position where the change instruction or the stop instruction is to be printed on the medium 30, the burden on the user is reduced, and it is possible to eliminate an artificial error in determining the position where the change instruction or the stop instruction is to be printed.

In addition, according to the present embodiment, such a configuration may be such that the control section 11 is configured to, when it is necessary to change the setting of the post-process, print the change instruction and the stop instruction at the position between the n-th image and the (n+1)-th image on the medium 30.

According to the configuration, the control section 11 prints the stop instruction of the transport together with the change instruction at the position between the n-th image and the (n+1)-th image on the medium 30. Accordingly, in the post-processing machine that performs the post-process, it is possible to stop transport of the medium 30 at an appropriate timing at which the setting is to be changed, and to perform the changing work.

In addition, according to the present embodiment, such a configuration may be such that the control section 11 is configured to, when it is necessary to change the setting of the post-process, cause the printing section 18 to print the information based on the post-process setting information and the stop instruction of the transport of the medium 30 at the position between the n-th image and the (n+1)-th image on the medium 30.

According to the configuration, the control section 11 prints the information based on the post-process setting information together with the stop instruction of the transport at the position between the n-th image and the (n+1)-th image on the medium 30. Although the change instruction can be said to be a kind of information based on the post-process setting information, the information based on the post-process setting information includes information other than the change instruction of the post-process setting. Therefore, for example, even when the medium 30 is cut between the n-th image and the (n+1)-th image, since the information based on the post-process setting information is printed, the user who performs the post-process can obtain more information.

Further, according to the present embodiment, such a configuration may be such that the control section 11 is configured to set the plurality of print jobs included in the designated two or more print jobs to the collective print job group which is a group in which the print jobs are grouped with respect to a predetermined common item, in comparing the n-th post-processing setting information and the (n+1)-th post-processing setting information, the relationship between the n-th print job and the (n+1)-th print job belonging to the collective print job group is target.

According to the configuration, when there is no change in the setting of the post-process between the n-th print job and the (n+1)-th print job which belong to the collective print job group and are continuously printing targets, the control section 11 does not print the information based on the post-process setting information which is set to be printed at the position between the n-th image and the (n+1)-th image on the medium 30. Thus, for example, when the medium 30 is cut in a collective print job group unit, the amount of the medium required for printing one collective print job group can be suppressed.

The plurality of print jobs included in the designated two or more print jobs means all or part of the designated two or more print jobs. For example, the two or more print jobs for which the second print mode is designated by the user through the operation of the management screen 50 may include the collective print job group and print jobs that do not belong to the collective print job group. The two or more print jobs designated by the user through the operation of the management screen 50 may naturally include the plurality of collective print job groups.

Further, according to the present embodiment, the print setting information includes the cutting information that defines in what unit the medium 30 is to be cut. The control section 11 may be configured to set the plurality of print jobs included in the designated two or more print jobs to the collective print job group which is a group in which the plurality of print jobs are grouped with respect to a predetermined common item, and when the cutting information is the first cutting information, in comparing the n-th post-processing setting information and the (n+1)-th post-processing setting information, the relationship between the n-th print job and the (n+1)-th print job belonging to the collective print job group target, in comparing the n-th post-processing setting information and the (n+1)-th post-processing setting information, all of the specified print jobs linked to the post-processing setting information target.

According to the configuration, the control section 11 limits or does not limit the range of the print job to be compared when comparing the post-process setting information between the print jobs adjacent to each other in the printing order to within the collective print job group or not in accordance with the cutting information. Accordingly, when there is no change in the setting of the post-process according to the cutting information, it is possible to change the position on the medium 30 at which the information based on the post-process setting information is not printed.

Further, according to the present embodiment, such a configuration may be such that the post-process setting information associated with the print job is described in the header of the image data included in the print job.

According to the configuration, since the print job and the post-process setting information are integrated, the transmission of the print job and the post-process setting information to the printing device 10 and the acquisition processing of the post-process setting information associated with the print job can be simplified.

Further, according to the present embodiment, such a configuration may be such that the post-process setting information includes the format information for designating the print format of the change instruction, and the control section 11 is cause the printing section 18 to print the change instruction in the print format designated by the format information.

According to the above configuration, it is possible to make it easier for the user to recognize the presence of the change instruction in the medium 30 on which the n-th image, the (n+1)-th image, the change instruction, and the like are printed.

According to the present embodiment, such a configuration may be such that the control section 11 is configured to change the printing format of the change instruction within the range specified by the format information according to the comparison result between the n-th post-process setting information and the (n+1)-th post-process setting information and is configured to cause the printing section 18 to print the change instruction.

According to the configuration, the control section 11 changes the print format of the change instruction in accordance with the comparison result between the n-th post-process setting information and the (n+1)-th post-process setting information, and thus it is possible to improve the convenience of the user who visually recognizes the printed change instruction and performs the setting change work of the post-process.

Further, according to the present embodiment, the control section 11 causes the printing section 18 to print the change instruction in the form of characters, the code image, or the combination of characters and the code image.

According to the configuration, it is possible to print the change instruction in a form that is easy for the user to understand or in a form that is easy for the post-processing machine to use.

According to the present embodiment, when the post-process first executed on the medium 30 after printing by the printing section 18 is the primary post-process and the post-process executed after the primary post-process on the medium 30 after printing by the printing section 18 is the secondary post-process, the primary post-process is performed in the order of the region of the (n+1)-th image and the region of the n-th image on the medium 30, and the secondary post-process is executed in the order of the region of the n-th image and the region of the (n+1)-th image on the medium 30. Then, the control section 11 is configured to compare the n-th post-process setting information with the (n+1)-th post-process setting information and when it is determined that it is necessary to change the setting of the primary post-process for the region of the n-th image on the medium 30, the control section 11 is configured to cause the printing section 18 to print the first change instruction, which is the setting change instruction of the primary post-process, at the position between the n-th image and the (n+1)-th image on the medium 30. Further, the control section 11 is configured to compare the n-th post-process setting information with the (n+1)-th post-process setting information and when it is determined that it is necessary to change the setting of the secondary post-process for the region of the (n+1)-th image on the medium 30, the control section 11 is configured to cause the printing section 18 to print the second change instruction, which is the setting change instruction of the secondary post-process, at the position between the n-th image and the (n+1)-th image on the medium 30.

According to the configuration, the control section 11 compares the n-th post-process setting information with the (n+1)-th post-process setting information, and when the change instruction is necessary for the primary post-process for the region of the n-th image, prints the first change instruction on the medium 30, it prints the second change instruction on the medium 30 when the change instruction is necessary for the secondary post-process for the region of the (n+1)-th image.

Further, according to the present embodiment, when the post-process to be executed next to the secondary post-process on the medium 30 after printing by the printing section 18 is the tertiary post-process, the tertiary post-process is configured to execute in the order of the region of the (n+1)-th image and the region of the n-th image on the medium 30. Then, the control section 11 is configured to compare the n-th post-process setting information with the (n+1)-th post-process setting information and when it is determined that it is necessary to change the setting of the tertiary post-process for the region of the n-th image on the medium 30, the control section 11 is configured to cause the printing section 18 to print the third change instruction, which is the change instruction of the setting of the tertiary post-process, at the position between the first change instruction and the n-th image on the medium 30.

According to the configuration, the control section 11 compares the n-th post-process setting information with the (n+1)-th post-process setting information, and when the change instruction is necessary for the tertiary post-process on the region of the n-th image, it can print the third change instruction at an appropriate position on the medium 30.

In addition, according to the present embodiment, such a configuration may be such that the control section 11 is configured to, when characters are included in the first change instruction and the second change instruction, cause the printing section 18 to print the characters of the first change instruction and the characters of the second change instruction indifferent directions.

According to the configuration, the control section 11 can perform printing by setting the direction of the characters of the first change instruction to the direction which is easily read by the user when the medium 30 is the target of the primary post-process, and can perform printing by setting the direction of the characters of the second change instruction to the direction which is easily read by the user when the medium 30 is the target of the secondary post-process.

According to the present embodiment, such a configuration may be such that the control section 11 is configured to, after the printing on the medium 30 based on the image data of the last print job belonging to the collective print job group is completed, cause the printing section 18 to print at least a part of each piece of post-process setting information associated with each print job belonging to the collective print job group in the printing order of the print job or in the reverse order of the printing of the print job at a position upstream in the transport direction of the medium 30 from the image printed based on the image data of the last print job on the medium 30. That is, the roll information is printed.

According to the configuration, the user who sees the medium 30 after printing can first visually recognize the roll information and recognize the post-process setting information of each print job or the outline of the printing of each print job performed on the medium 30.

The present embodiment is not limited to the printing device 10 or the printing system, and discloses various categories such as a method including processes executed by the device or the system, and the program 12 for causing the processor to execute the method.

For example, the print control program 12, wherein sets print setting for the printing section 18 based on the print setting information including the post-process setting information indicating the post-process settings to be executed on the medium 30 on which the image based on the image data held by the print job has been printed, and causes the processor to execute the print control function for causing the printing section 18 to print two or more designated print jobs from among the plurality of print jobs, and when n is an integer equal to or greater than 1, and when the image to be the print target on the medium 30 based on the image data of the n-th print job which is the n-th print target by the printing section 18 among the two or more print jobs is the n-th image, the image to be the print target on the medium 30 based on the image data of the (n+1)-th print job which is the (n+1)-th print target by the printing section 18 among the two or more print jobs is the (n+1)-th image, the post-process setting information associated with the n-th print job is n-th post-process setting information, and the post-process setting information associated with the (n+1)-th print job is (n+1)-th post-process setting information, the print control function compares the n-th post-process setting information with the (n+1)-th post-process setting information to determine whether or not it is necessary to change the post-process setting, and when it is not necessary to change the post-process setting, the control section 11 changes the print setting so as not to print information based on the post-process setting information which has been set as a print setting for the printing section 18 to print at the position between the n-th image and the (n+1)-th image on the medium 30, and can recognize the print control program 12 that changes the printing setting so as not to perform printing.

The processing described above as being executed by the control section 11 of the printing device 10 may be executed using resources such as the control section 2 and the storage section 3 there of, by the print control device, that is, the information processing device 1. The print control program 12 may be executed by the information processing device 1.

According to the present embodiment, for example, the print control device communicably connected to the printing device 10 includes the storage section 3 for storing the print job having the image data and the control section 2 for performing print setting for the printing device 10 based on the print setting information including the post-process setting information indicating the post-process settings to be executed on the medium 30 on which the image based on the image data has been printed and causing the printing device 10 to print two or more designated print jobs from among the plurality of print jobs stored in the storage section 3, wherein when n is an integer equal to or greater than 1, and when the image to be the print target on the medium 30 based on the image data of the n-th print job which is the n-th print target by the printing device 10 among the two or more print jobs is the n-th image, the image to be the print target on the medium 30 based on the image data of the (n+1)-th print job which is the (n+1)-th print target by the printing device 10 among the two or more print jobs is the (n+1)-th image, the post-process setting information associated with the n-th print job is n-th post-process setting information, and the post-process setting information associated with the (n+1)-th print job is (n+1)-th post-process setting information, the control device 2 compares the n-th post-process setting information with the (n+1)-th post-process setting information to determine whether or not it is necessary to change the post-process setting, and when it is not necessary to change the post-process setting, the control section 11 changes the print setting so as not to print information based on the post-process setting information which has been set as a print setting for the printing section 18 to print at the position between the n-th image and the (n+1)-th image on the medium 30, and such a configuration is disclosed.

What is claimed is:

1. A printing device comprising:
    a printing section for printing a print job on a medium;
    a control section that is configured to receive designation of a first print mode or a second print mode for one or more print jobs and that is configured to
        perform print setting, in accordance with print setting information, for print jobs for which the first print mode or the second print mode is designated and cause the printing section to execute printing in accordance with the print setting; and
    a storage section, wherein
    a consumption amount of the medium in printing of one of the print jobs in the second print mode is larger than a consumption amount of the medium in printing of one of the print jobs in the first print mode,
    the control section is configured to acquire, of the print setting information for the print job for which the first print mode is designated, specific setting information that causes a difference in the consumption amount between printing in the first print mode and printing in the second print mode, from one of
        initial setting information of printing stored in advance in the storage section,
        incidental setting information accompanying the print job for which the first print mode is designated, or
        a first setting information file that is saved in a predetermined folder and that is a file different from both the initial setting information and the incidental setting information, and
    is configured to perform print setting of the print job for which the first print mode is designated according to the acquired specific setting information,
    when the control section acquires the specific setting information for the print job for which the first print mode is designated from the initial setting information, the control section acquires the specific setting information among the print setting information for the print job for which the second print mode is designated from either
        incidental setting information attached to the print job for which the second print mode is designated or
        a second setting information file which is stored in a predetermined folder and is a file different from all of the initial setting information, the incidental setting information, and the first setting information file,
    when the control section acquires the specific setting information for the print job for which the first print mode is designated from the incidental setting information, the control section acquires the specific setting information for the print job for which the second print mode is designated from the second setting information file,
    when the control section acquires the specific setting information for the print job for which the first print mode is designated from the first setting information file, the control section acquires the print setting information for the print job for which the second print mode is designated from either
        incidental setting information accompanying the print job for which the second print mode is designated or
        the second setting information file, and
    the control section performs print setting of the print job for which the second print mode is designated in accordance with the acquired specific setting information for the print job for which the second print mode is designated.

2. The printing device according to claim 1, wherein the specific setting information includes information on a number of print copies.

3. The printing device according to claim 1, wherein the specific setting information includes information on a margin amount to be secured in the medium.

4. The printing device according to claim 1, wherein the specific setting information includes information indicating presence or absence of printing for a post-process to be performed on the medium after printing of the print job by the printing section.

5. The printing device according to claim 1, wherein the specific setting information includes information indicating presence or absence of printing of a header of the print job, a footer of the print job, or both a header and a footer of the print job.

6. The printing device according to claim 1, further comprising:
    a display section configured to display a list of print jobs, wherein
    the control section is configured to receive, as designation of the first print mode, a state in which no selection is made in a selection section displayed corresponding to each of the print jobs in the list, and is configured to receive, as designation of the second print mode, a state in which selection is made in the selection section.

7. The printing device according to claim 1, further comprising:

a display section configured to display a list of print jobs, wherein the control section is configured to receive, as the designation of the first print mode, a state not included in a selection range input by the user in the list, and is configured to receive, as the designation of the second print mode, a state included in the selection range.

8. The printing device according to claim 1, further comprising:

a collective receive button for collectively receiving designation of the second print mode for the plurality of print jobs, wherein the control section is configured to, when the collective receive button is operated, collectively receive the designation of the second print mode for the plurality of print jobs described in the second setting information file, and is configured to acquire the specific setting information for the plurality of print jobs for which the second print mode is designated from the second setting information file.

* * * * *